United States Patent
Nixon et al.

(10) Patent No.: US 10,311,015 B2
(45) Date of Patent: Jun. 4, 2019

(54) DISTRIBUTED BIG DATA IN A PROCESS CONTROL SYSTEM

(71) Applicant: FISHER-ROSEMOUNT SYSTEMS, INC., Round Rock, TX (US)

(72) Inventors: Mark J. Nixon, Round Rock, TX (US); Paul Richard Muston, Narborough (GB); Terrence L. Blevins, Round Rock, TX (US); Wilhelm K. Wojsznis, Austin, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 212 days.

(21) Appl. No.: 14/212,493

(22) Filed: Mar. 14, 2014

(65) Prior Publication Data

US 2014/0277604 A1    Sep. 18, 2014

Related U.S. Application Data

(60) Provisional application No. 61/783,112, filed on Mar. 14, 2013.

(51) Int. Cl.
*G06F 15/17* (2006.01)
*G05B 19/41* (2006.01)
(Continued)

(52) U.S. Cl.
CPC ... *G06F 15/17331* (2013.01); *G05B 13/0265* (2013.01); *G05B 19/4185* (2013.01);
(Continued)

(58) Field of Classification Search
None
See application file for complete search history.

(56) References Cited

U.S. PATENT DOCUMENTS

| | | | |
|---|---|---|---|
| 4,451,047 A | 5/1984 | Herd et al. | |
| 4,593,367 A * | 6/1986 | Slack | G06K 9/62 382/160 |

(Continued)

FOREIGN PATENT DOCUMENTS

| | | |
|---|---|---|
| AU | 2010257310 A1 | 7/2012 |
| CN | 1409179 A | 4/2003 |

(Continued)

OTHER PUBLICATIONS

Woo, "Intel Drops a Big Data Shocker", downloaded from the Internet at: <http://forbes.com/sites/bwoo/2013/02/27/intel-drops-a-big-data-shocker/?partner=ya> dated Feb. 27, 2013.

(Continued)

*Primary Examiner* — Mohammad Ali
*Assistant Examiner* — Kelvin Booker
(74) *Attorney, Agent, or Firm* — Marshall, Gerstein & Borun LLP

(57) ABSTRACT

A distributed big data device in a process plant includes an embedded big data appliance configured to locally stream and store, as big data, data that is generated, received, or observed by the device, and to perform one or more learning analyzes on at least a portion of the stored data. The embedded big data appliance generates or creates learned knowledge based on a result of the learning analysis, which the device may use to modify its operation to control a process in real-time in the process plant, and/or which the device may transmit to other devices in the process plant. The distributed big data device may be a field device, a controller, an input/output device, or other process plant device, and may utilize learned knowledge created by other devices when performing its learning analysis.

29 Claims, 5 Drawing Sheets

(51) Int. Cl.
  *G06F 15/173* (2006.01)
  *G05B 19/418* (2006.01)
  *G05B 13/02* (2006.01)
  *G06F 9/54* (2006.01)

(52) U.S. Cl.
  CPC ...... *G06F 9/54* (2013.01); *G05B 2219/31211* (2013.01); *G05B 2219/31324* (2013.01); *G06F 15/173* (2013.01); *G06F 2212/2515* (2013.01); *Y02P 90/18* (2015.11)

(56) References Cited

U.S. PATENT DOCUMENTS

| | | |
|---|---|---|
| 4,901,221 A | 2/1990 | Kodosky et al. |
| 4,914,568 A | 4/1990 | Kodosky et al. |
| 5,111,531 A | 5/1992 | Grayson et al. |
| 5,164,897 A | 11/1992 | Clark et al. |
| 5,291,587 A | 3/1994 | Kodosky et al. |
| 5,301,301 A | 4/1994 | Kodosky et al. |
| 5,301,336 A | 4/1994 | Kodosky et al. |
| 5,475,851 A | 12/1995 | Kodosky et al. |
| 5,481,740 A | 1/1996 | Kodosky |
| 5,481,741 A | 1/1996 | McKaskle et al. |
| 5,497,500 A | 3/1996 | Rogers et al. |
| 5,544,320 A | 8/1996 | Konrad |
| 5,568,491 A | 10/1996 | Beal et al. |
| 5,598,572 A | 1/1997 | Tanikoshi et al. |
| 5,610,828 A | 3/1997 | Kodosky et al. |
| 5,652,909 A | 7/1997 | Kodosky |
| D384,050 S | 9/1997 | Kodosky |
| D384,051 S | 9/1997 | Kodosky |
| D384,052 S | 9/1997 | Kodosky |
| D387,750 S | 12/1997 | Kodosky |
| 5,732,277 A | 3/1998 | Kodosky et al. |
| 5,734,863 A | 3/1998 | Kodosky et al. |
| 5,737,622 A | 4/1998 | Rogers et al. |
| 5,801,942 A | 9/1998 | Nixon et al. |
| 5,801,946 A | 9/1998 | Nissen et al. |
| 5,821,934 A | 10/1998 | Kodosky et al. |
| 5,828,851 A | 10/1998 | Nixon et al. |
| 5,838,563 A | 11/1998 | Dove et al. |
| 5,856,931 A | 1/1999 | McCasland |
| 5,862,052 A | 1/1999 | Nixon et al. |
| 5,862,054 A | 1/1999 | Li |
| 5,909,368 A | 6/1999 | Nixon et al. |
| 5,917,489 A | 6/1999 | Thurlow et al. |
| 5,940,294 A | 8/1999 | Dove |
| 5,971,747 A | 10/1999 | Lemelson et al. |
| 5,980,078 A | 11/1999 | Krivoshein et al. |
| 5,987,246 A | 11/1999 | Thomsen et al. |
| 5,988,847 A | 11/1999 | McLaughlin et al. |
| 5,990,906 A | 11/1999 | Hudson et al. |
| 5,995,916 A | 11/1999 | Nixon et al. |
| 6,009,422 A | 12/1999 | Ciccarelli |
| 6,032,208 A | 2/2000 | Nixon et al. |
| 6,064,409 A | 5/2000 | Thomsen et al. |
| 6,078,320 A | 6/2000 | Dove et al. |
| 6,098,116 A | 8/2000 | Nixon et al. |
| 6,167,464 A | 12/2000 | Kretschmann |
| 6,173,438 B1 | 1/2001 | Kodosky et al. |
| 6,178,504 B1 | 1/2001 | Fieres et al. |
| 6,195,591 B1 | 2/2001 | Nixon et al. |
| 6,219,628 B1 | 4/2001 | Kodosky et al. |
| 6,266,726 B1 | 7/2001 | Nixon et al. |
| 6,278,374 B1 | 8/2001 | Ganeshan |
| 6,285,966 B1 | 9/2001 | Brown et al. |
| 6,295,513 B1 | 9/2001 | Thackston |
| 6,324,877 B2 | 12/2001 | Neeley |
| 6,347,253 B1 | 2/2002 | Fujita et al. |
| 6,421,570 B1 | 7/2002 | McLaughlin et al. |
| 6,442,515 B1 | 8/2002 | Varma et al. |
| 6,463,352 B1 | 10/2002 | Tadokoro et al. |
| 6,529,780 B1 | 3/2003 | Soergel et al. |
| 6,535,883 B1 | 3/2003 | Lee et al. |
| 6,563,430 B1 | 5/2003 | Kemink et al. |
| 6,584,601 B1 | 6/2003 | Kodosky et al. |
| 6,608,638 B1 | 8/2003 | Kodosky et al. |
| 6,609,036 B1 | 8/2003 | Bickford |
| 6,658,114 B1 | 12/2003 | Farn et al. |
| 6,701,285 B2 | 3/2004 | Salonen |
| 6,715,078 B1 | 3/2004 | Chasko et al. |
| 6,715,139 B1 | 3/2004 | Kodosky et al. |
| 6,763,515 B1 | 7/2004 | Vazquez et al. |
| 6,768,116 B1 | 7/2004 | Berman et al. |
| 6,772,017 B1 | 8/2004 | Dove et al. |
| 6,784,903 B2 | 8/2004 | Kodosky et al. |
| 6,847,850 B2 | 1/2005 | Grumelart |
| 6,868,538 B1 | 3/2005 | Nixon et al. |
| 6,917,839 B2 | 7/2005 | Bickford |
| 6,934,667 B2 | 8/2005 | Kodosky et al. |
| 6,934,668 B2 | 8/2005 | Kodosky et al. |
| 6,954,724 B2 | 10/2005 | Kodosky et al. |
| 6,961,686 B2 | 11/2005 | Kodosky et al. |
| 6,965,886 B2 | 11/2005 | Govrin et al. |
| 6,970,758 B1 | 11/2005 | Shi et al. |
| 6,971,066 B2 | 11/2005 | Schultz et al. |
| 6,983,228 B2 | 1/2006 | Kodosky et al. |
| 6,993,466 B2 | 1/2006 | Kodosky et al. |
| 7,000,190 B2 | 2/2006 | Kudukoli et al. |
| 7,006,881 B1 | 2/2006 | Hoffberg et al. |
| 7,010,470 B2 | 3/2006 | Kodosky et al. |
| 7,062,718 B2 | 6/2006 | Kodosky et al. |
| 7,072,722 B1 | 7/2006 | Colonna et al. |
| 7,123,974 B1 | 10/2006 | Hamilton |
| 7,134,086 B2 | 11/2006 | Kodosky |
| 7,134,090 B2 | 11/2006 | Kodosky et al. |
| 7,143,149 B2 | 11/2006 | Oberg et al. |
| 7,143,289 B2 | 11/2006 | Denning et al. |
| 7,177,786 B2 | 2/2007 | Kodosky et al. |
| 7,185,287 B2 | 2/2007 | Ghercioiu et al. |
| 7,200,838 B2 | 4/2007 | Kodosky et al. |
| 7,210,117 B2 | 4/2007 | Kudukoli et al. |
| 7,213,057 B2 | 5/2007 | Trethewey et al. |
| 7,216,334 B2 | 5/2007 | Kodosky et al. |
| 7,219,306 B2 | 5/2007 | Kodosky et al. |
| 7,222,131 B1 | 5/2007 | Grewal et al. |
| 7,283,914 B2 | 10/2007 | Poorman et al. |
| 7,283,971 B1 | 10/2007 | Levine et al. |
| 7,302,675 B2 | 11/2007 | Rogers et al. |
| 7,314,169 B1 | 1/2008 | Jasper et al. |
| 7,340,737 B2 | 3/2008 | Ghercioiu et al. |
| 7,343,605 B2 | 3/2008 | Langkafel et al. |
| 7,346,404 B2 | 3/2008 | Eryurek et al. |
| 7,367,028 B2 | 4/2008 | Kodosky et al. |
| 7,478,337 B2 | 1/2009 | Kodosky et al. |
| 7,506,304 B2 | 3/2009 | Morrow et al. |
| 7,530,052 B2 | 5/2009 | Morrow et al. |
| 7,530,113 B2 | 5/2009 | Braun |
| 7,536,548 B1 | 5/2009 | Batke et al. |
| RE40,817 E | 6/2009 | Krivoshein et al. |
| 7,541,920 B2 | 6/2009 | Tambascio et al. |
| 7,548,873 B2 * | 6/2009 | Veeningen ............ G06Q 10/06 705/7.12 |
| 7,558,711 B2 | 7/2009 | Kodosky et al. |
| 7,565,306 B2 | 7/2009 | Apostolides |
| 7,574,690 B2 | 8/2009 | Shah et al. |
| 7,594,220 B2 | 9/2009 | Kodosky et al. |
| 7,598,856 B1 | 10/2009 | Nick et al. |
| 7,606,681 B2 | 10/2009 | Esmaili et al. |
| 7,616,095 B2 | 11/2009 | Jones et al. |
| 7,617,542 B2 | 11/2009 | Vataja |
| 7,627,860 B2 | 12/2009 | Kodosky et al. |
| 7,630,914 B2 * | 12/2009 | Veeningen ............ G06Q 10/06 705/38 |
| 7,640,007 B2 | 12/2009 | Chen et al. |
| 7,644,052 B1 * | 1/2010 | Chang ................... G06N 5/022 706/45 |
| 7,650,264 B2 | 1/2010 | Kodosky et al. |
| 7,653,563 B2 * | 1/2010 | Veeningen ......... G06Q 10/0635 705/38 |
| 7,668,608 B2 | 2/2010 | Nixon et al. |
| 7,676,281 B2 | 3/2010 | Hood et al. |
| 7,680,546 B2 | 3/2010 | Gilbert et al. |
| 7,684,877 B2 | 3/2010 | Weatherhead et al. |

(56) References Cited

U.S. PATENT DOCUMENTS

| | | | |
|---|---|---|---|
| RE41,228 E | 4/2010 | Kodosky et al. |
| 7,694,273 B2 | 4/2010 | Kodosky et al. |
| 7,707,014 B2 | 4/2010 | Kodosky et al. |
| 7,715,929 B2 | 5/2010 | Skourup et al. |
| 7,716,489 B1 | 5/2010 | Brandt et al. |
| 7,720,727 B2 | 5/2010 | Keyes et al. |
| 7,818,715 B2 | 10/2010 | Kodosky et al. |
| 7,818,716 B2 | 10/2010 | Kodosky et al. |
| 7,827,122 B1 | 11/2010 | Campbell, Jr. et al. |
| 7,831,914 B2 | 11/2010 | Kodosky et al. |
| 7,844,908 B2 | 11/2010 | Kodosky et al. |
| 7,853,431 B2 * | 12/2010 | Samardzija | 702/179 |
| 7,865,349 B2 | 1/2011 | Kodosky et al. |
| 7,882,490 B2 | 2/2011 | Kodosky et al. |
| 7,882,491 B2 | 2/2011 | Kodosky et al. |
| 7,925,979 B2 | 4/2011 | Forney et al. |
| 7,930,639 B2 | 4/2011 | Baier et al. |
| 7,934,095 B2 | 4/2011 | Laberteaux et al. |
| 7,937,665 B1 | 5/2011 | Vazquez et al. |
| 7,962,440 B2 | 6/2011 | Baier et al. |
| 7,978,059 B2 | 7/2011 | Petite et al. |
| 7,979,843 B2 | 7/2011 | Kodosky et al. |
| 7,984,423 B2 | 7/2011 | Kodosky et al. |
| 7,987,448 B2 | 7/2011 | Kodosky et al. |
| 8,014,722 B2 | 9/2011 | Abel et al. |
| 8,028,241 B2 | 9/2011 | Kodosky et al. |
| 8,028,242 B2 | 9/2011 | Kodosky et al. |
| 8,055,787 B2 | 11/2011 | Victor et al. |
| 8,060,834 B2 | 11/2011 | Lucas et al. |
| 8,073,967 B2 | 12/2011 | Peterson et al. |
| 8,074,201 B2 | 12/2011 | Ghercioiu et al. |
| 8,099,712 B2 | 1/2012 | Kodosky et al. |
| 8,102,400 B1 | 1/2012 | Cook et al. |
| 8,126,964 B2 | 2/2012 | Pretlove et al. |
| 8,132,225 B2 | 3/2012 | Chand et al. |
| 8,146,053 B2 | 3/2012 | Morrow et al. |
| 8,166,296 B2 | 4/2012 | Buer et al. |
| 8,171,137 B1 | 5/2012 | Parks et al. |
| 8,185,217 B2 | 5/2012 | Thiele |
| 8,185,495 B2 * | 5/2012 | Clark | G06F 17/30174 707/610 |
| 8,185,832 B2 | 5/2012 | Kodosky et al. |
| 8,185,833 B2 | 5/2012 | Kodosky et al. |
| 8,185,871 B2 | 5/2012 | Nixon et al. |
| 8,190,888 B2 | 5/2012 | Batke et al. |
| 8,191,005 B2 | 5/2012 | Baier et al. |
| 8,214,455 B2 | 7/2012 | Baier et al. |
| 8,218,651 B1 | 7/2012 | Eshet et al. |
| 8,219,669 B2 | 7/2012 | Agrusa et al. |
| 8,224,496 B2 | 7/2012 | Musti et al. |
| 8,239,848 B2 | 8/2012 | Ghercioiu et al. |
| 8,266,066 B1 | 9/2012 | Wezter et al. |
| 8,290,762 B2 | 10/2012 | Kodosky et al. |
| 8,307,330 B2 | 11/2012 | Kumar et al. |
| 8,316,313 B2 | 11/2012 | Campney et al. |
| 8,321,663 B2 | 11/2012 | Medvinsky et al. |
| 8,327,130 B2 | 12/2012 | Wilkinson, Jr. et al. |
| 8,350,666 B2 | 1/2013 | Kore |
| 8,359,567 B2 | 1/2013 | Kornerup et al. |
| 8,397,172 B2 | 3/2013 | Kodosky et al. |
| 8,397,205 B2 | 3/2013 | Kornerup et al. |
| 8,413,118 B2 | 4/2013 | Kodosky et al. |
| 8,417,360 B2 | 4/2013 | Sustaeta et al. |
| 8,417,595 B2 | 4/2013 | Keyes et al. |
| 8,418,071 B2 | 4/2013 | Kodosky et al. |
| 8,429,627 B2 | 4/2013 | Jedlicka et al. |
| 8,448,135 B2 | 5/2013 | Kodosky |
| 8,521,332 B2 | 8/2013 | Tiemann et al. |
| 8,532,795 B2 | 9/2013 | Adavi et al. |
| 8,570,922 B2 | 10/2013 | Pratt, Jr. et al. |
| 8,612,870 B2 | 12/2013 | Kodosky et al. |
| 8,624,725 B1 | 1/2014 | MacGregor |
| 8,640,112 B2 | 1/2014 | Yi et al. |
| 8,656,351 B2 | 2/2014 | Kodosky et al. |
| 8,688,780 B2 | 4/2014 | Gordon et al. |
| 8,781,776 B2 | 7/2014 | Onda et al. |
| 8,832,236 B2 | 9/2014 | Hernandez et al. |
| 8,943,469 B2 | 1/2015 | Kumar et al. |
| 8,977,851 B2 | 3/2015 | Neitzel et al. |
| 9,002,973 B2 | 4/2015 | Panther |
| 9,021,021 B2 * | 4/2015 | Backholm | H04L 29/08099 709/203 |
| 9,024,972 B1 | 5/2015 | Bronder et al. |
| 9,038,043 B1 * | 5/2015 | Fleetwood | G06Q 30/0246 717/151 |
| 9,047,007 B2 | 6/2015 | Kodosky et al. |
| 9,088,665 B2 | 7/2015 | Boyer et al. |
| 9,098,164 B2 | 8/2015 | Kodosky |
| 9,110,558 B2 | 8/2015 | Kodosky |
| 9,119,166 B1 | 8/2015 | Sheikh |
| 9,122,764 B2 | 9/2015 | Neitzel et al. |
| 9,122,786 B2 | 9/2015 | Cammert et al. |
| 9,134,895 B2 | 9/2015 | Dove et al. |
| 9,229,871 B2 | 1/2016 | Washiro |
| 9,235,395 B2 | 1/2016 | Kodosky et al. |
| 9,338,218 B1 | 5/2016 | Florissi et al. |
| 9,361,320 B1 | 6/2016 | Vijendra et al. |
| 9,397,836 B2 | 7/2016 | Nixon et al. |
| 9,424,398 B1 | 8/2016 | McLeod et al. |
| 9,430,114 B1 | 8/2016 | Dingman et al. |
| 9,459,809 B1 | 10/2016 | Chen et al. |
| 9,532,232 B2 | 12/2016 | Dewey et al. |
| 9,541,905 B2 * | 1/2017 | Nixon | G05B 11/01 |
| 9,558,220 B2 | 1/2017 | Nixon et al. |
| 9,652,213 B2 | 5/2017 | MacCleery et al. |
| 9,678,484 B2 | 6/2017 | Nixon et al. |
| 9,697,170 B2 | 7/2017 | Nixon et al. |
| 9,804,588 B2 | 10/2017 | Blevins et al. |
| 9,892,353 B1 | 2/2018 | Lui et al. |
| 2002/0010694 A1 | 1/2002 | Navab et al. |
| 2002/0035495 A1 | 3/2002 | Spira et al. |
| 2002/0052715 A1 | 5/2002 | Maki |
| 2002/0054130 A1 | 5/2002 | Abbott et al. |
| 2002/0064138 A1 | 5/2002 | Saito et al. |
| 2002/0080174 A1 | 6/2002 | Kodosky et al. |
| 2002/0087419 A1 | 7/2002 | Andersson et al. |
| 2002/0094085 A1 | 7/2002 | Roberts |
| 2002/0120475 A1 | 8/2002 | Morimoto |
| 2002/0128998 A1 | 9/2002 | Kil et al. |
| 2002/0130846 A1 | 9/2002 | Nixon et al. |
| 2002/0138168 A1 | 9/2002 | Salonen |
| 2002/0138320 A1 | 9/2002 | Robertson et al. |
| 2002/0149497 A1 | 10/2002 | Jaggi |
| 2002/0159441 A1 | 10/2002 | Travaly et al. |
| 2002/0169514 A1 | 11/2002 | Eryurek et al. |
| 2003/0020726 A1 | 1/2003 | Charpentier |
| 2003/0023795 A1 | 1/2003 | Packwood et al. |
| 2003/0028495 A1 | 2/2003 | Pallante |
| 2003/0037119 A1 | 2/2003 | Austin |
| 2003/0061295 A1 | 3/2003 | Oberg et al. |
| 2003/0083756 A1 * | 5/2003 | Hsiung | G05B 15/02 700/28 |
| 2003/0084053 A1 | 5/2003 | Govrin et al. |
| 2003/0093309 A1 | 5/2003 | Tanikoshi et al. |
| 2003/0147351 A1 | 8/2003 | Greenlee |
| 2003/0154044 A1 * | 8/2003 | Lundstedt | G01N 21/274 702/104 |
| 2003/0195934 A1 | 10/2003 | Peterson et al. |
| 2004/0005859 A1 | 1/2004 | Ghercioiu et al. |
| 2004/0012632 A1 | 1/2004 | King et al. |
| 2004/0014479 A1 | 1/2004 | Milman |
| 2004/0075689 A1 | 4/2004 | Schleiss et al. |
| 2004/0093102 A1 | 5/2004 | Liiri et al. |
| 2004/0117233 A1 | 6/2004 | Rapp |
| 2004/0133457 A1 | 7/2004 | Sadiq et al. |
| 2004/0153437 A1 | 8/2004 | Buchan |
| 2004/0153804 A1 | 8/2004 | Blevins et al. |
| 2004/0203874 A1 | 10/2004 | Brandt et al. |
| 2004/0204775 A1 | 10/2004 | Keyes et al. |
| 2004/0210330 A1 | 10/2004 | Birkle |
| 2004/0230328 A1 | 11/2004 | Armstrong et al. |
| 2004/0233930 A1 | 11/2004 | Colby |
| 2005/0005259 A1 | 1/2005 | Avery et al. |
| 2005/0060111 A1 | 3/2005 | Ramillon et al. |

(56) References Cited

U.S. PATENT DOCUMENTS

| | | |
|---|---|---|
| 2005/0062677 A1 | 3/2005 | Nixon et al. |
| 2005/0080799 A1 | 4/2005 | Harnden et al. |
| 2005/0096872 A1 | 5/2005 | Blevins et al. |
| 2005/0130634 A1 | 6/2005 | Godfrey |
| 2005/0164684 A1 | 7/2005 | Chen et al. |
| 2005/0182650 A1 | 8/2005 | Maddox et al. |
| 2005/0187649 A1* | 8/2005 | Funk ............... G05B 19/4184 700/121 |
| 2005/0213768 A1 | 9/2005 | Durham et al. |
| 2005/0222691 A1 | 10/2005 | Glas et al. |
| 2005/0222698 A1 | 10/2005 | Eryurek et al. |
| 2005/0264527 A1 | 12/2005 | Lin |
| 2006/0031826 A1 | 2/2006 | Hiramatsu et al. |
| 2006/0064291 A1* | 3/2006 | Pattipatti ............ G05B 23/0243 703/14 |
| 2006/0064472 A1 | 3/2006 | Mirho |
| 2006/0069717 A1 | 3/2006 | Mamou et al. |
| 2006/0087402 A1 | 4/2006 | Manning et al. |
| 2006/0168396 A1 | 7/2006 | LaMothe et al. |
| 2006/0200260 A1 | 9/2006 | Hoffberg et al. |
| 2006/0200771 A1 | 9/2006 | Nielsen et al. |
| 2006/0218107 A1* | 9/2006 | Young ................ G05B 13/027 706/13 |
| 2006/0235741 A1 | 10/2006 | Deaton et al. |
| 2006/0241792 A1 | 10/2006 | Pretlove et al. |
| 2006/0288091 A1 | 12/2006 | Oh et al. |
| 2006/0288330 A1 | 12/2006 | Bahrami et al. |
| 2006/0291481 A1 | 12/2006 | Kumar |
| 2006/0294087 A1 | 12/2006 | Mordvinov |
| 2007/0005266 A1 | 1/2007 | Blevins et al. |
| 2007/0014406 A1 | 1/2007 | Scheidt et al. |
| 2007/0038889 A1 | 2/2007 | Wiggins et al. |
| 2007/0067725 A1 | 3/2007 | Cahill et al. |
| 2007/0078696 A1 | 4/2007 | Hardin |
| 2007/0112574 A1 | 5/2007 | Greene |
| 2007/0118516 A1 | 5/2007 | Li et al. |
| 2007/0130310 A1 | 6/2007 | Batke et al. |
| 2007/0130572 A1 | 6/2007 | Gilbert et al. |
| 2007/0132779 A1 | 6/2007 | Gilbert et al. |
| 2007/0139441 A1 | 6/2007 | Lucas et al. |
| 2007/0142936 A1 | 6/2007 | Denison et al. |
| 2007/0168060 A1 | 7/2007 | Nixon et al. |
| 2007/0179645 A1 | 8/2007 | Nixon et al. |
| 2007/0185754 A1 | 8/2007 | Schmidt |
| 2007/0211079 A1 | 9/2007 | Nixon et al. |
| 2007/0239292 A1 | 10/2007 | Ehrman et al. |
| 2007/0250292 A1* | 10/2007 | Alagappan ............. C10B 55/00 702/184 |
| 2007/0265801 A1 | 11/2007 | Foslien et al. |
| 2007/0265866 A1 | 11/2007 | Fehling et al. |
| 2008/0040719 A1 | 2/2008 | Shimizu et al. |
| 2008/0046104 A1 | 2/2008 | Van Camp et al. |
| 2008/0058968 A1 | 3/2008 | Sharma et al. |
| 2008/0065243 A1 | 3/2008 | Fallman et al. |
| 2008/0065705 A1 | 3/2008 | Miller |
| 2008/0065706 A1 | 3/2008 | Miller et al. |
| 2008/0076431 A1 | 3/2008 | Fletcher et al. |
| 2008/0078189 A1 | 4/2008 | Ando |
| 2008/0079596 A1 | 4/2008 | Baier et al. |
| 2008/0082180 A1 | 4/2008 | Blevins et al. |
| 2008/0082181 A1* | 4/2008 | Miller ................ G05B 23/021 700/30 |
| 2008/0082195 A1 | 4/2008 | Samardzija |
| 2008/0097622 A1 | 4/2008 | Forney et al. |
| 2008/0103843 A1 | 5/2008 | Goeppert et al. |
| 2008/0104189 A1 | 5/2008 | Baker et al. |
| 2008/0125912 A1 | 5/2008 | Heilman et al. |
| 2008/0126352 A1 | 5/2008 | Case |
| 2008/0126665 A1 | 5/2008 | Burr et al. |
| 2008/0143482 A1 | 6/2008 | Shoarinejad et al. |
| 2008/0174766 A1 | 7/2008 | Haaslahti et al. |
| 2008/0182592 A1 | 7/2008 | Cha et al. |
| 2008/0209443 A1 | 8/2008 | Suzuki |
| 2008/0249641 A1 | 10/2008 | Enver et al. |
| 2008/0274766 A1 | 11/2008 | Pratt et al. |
| 2008/0275971 A1 | 11/2008 | Pretlove et al. |
| 2008/0288321 A1 | 11/2008 | Dillon et al. |
| 2008/0297513 A1 | 12/2008 | Greenhill et al. |
| 2008/0301123 A1 | 12/2008 | Schneider et al. |
| 2009/0048853 A1 | 2/2009 | Hall |
| 2009/0049073 A1 | 2/2009 | Cho |
| 2009/0065578 A1 | 3/2009 | Peterson et al. |
| 2009/0070337 A1 | 3/2009 | Romem et al. |
| 2009/0070589 A1 | 3/2009 | Nayak et al. |
| 2009/0089233 A1 | 4/2009 | Gach et al. |
| 2009/0089359 A1 | 4/2009 | Siorek et al. |
| 2009/0089709 A1 | 4/2009 | Baier et al. |
| 2009/0094531 A1 | 4/2009 | Danieli et al. |
| 2009/0097502 A1 | 4/2009 | Yamamoto |
| 2009/0112335 A1 | 4/2009 | Mehta et al. |
| 2009/0112532 A1 | 4/2009 | Foslien et al. |
| 2009/0210386 A1 | 8/2009 | Cahill |
| 2009/0210802 A1 | 8/2009 | Hawkins et al. |
| 2009/0210814 A1 | 8/2009 | Agrusa et al. |
| 2009/0216341 A1 | 8/2009 | Enkerud et al. |
| 2009/0249237 A1 | 10/2009 | Jundt et al. |
| 2009/0284383 A1 | 11/2009 | Wiles et al. |
| 2009/0294174 A1 | 12/2009 | Harmer et al. |
| 2009/0300535 A1 | 12/2009 | Skourup et al. |
| 2009/0319058 A1 | 12/2009 | Rovaglio et al. |
| 2009/0325603 A1 | 12/2009 | Van Os et al. |
| 2009/0327014 A1 | 12/2009 | Labedz et al. |
| 2010/0036779 A1 | 2/2010 | Sadeh-Koniecpol et al. |
| 2010/0069008 A1 | 3/2010 | Oshima et al. |
| 2010/0076642 A1 | 3/2010 | Hoffberg et al. |
| 2010/0082132 A1 | 4/2010 | Marruchella et al. |
| 2010/0082158 A1 | 4/2010 | Lakomiak et al. |
| 2010/0106282 A1 | 4/2010 | Mackelprang et al. |
| 2010/0127821 A1 | 5/2010 | Jones et al. |
| 2010/0127824 A1 | 5/2010 | Moschl et al. |
| 2010/0145476 A1 | 6/2010 | Junk et al. |
| 2010/0169785 A1 | 7/2010 | Jesudason |
| 2010/0185857 A1 | 7/2010 | Neitzel et al. |
| 2010/0190442 A1 | 7/2010 | Citrano, III et al. |
| 2010/0192122 A1 | 7/2010 | Esfahan et al. |
| 2010/0222899 A1 | 9/2010 | Blevins et al. |
| 2010/0262929 A1 | 10/2010 | Avery |
| 2010/0275135 A1 | 10/2010 | Dunton et al. |
| 2010/0286798 A1 | 11/2010 | Keyes et al. |
| 2010/0290351 A1 | 11/2010 | Toepke et al. |
| 2010/0290359 A1 | 11/2010 | Dewey et al. |
| 2010/0293019 A1 | 11/2010 | Keyes et al. |
| 2010/0293564 A1 | 11/2010 | Gould et al. |
| 2010/0305736 A1 | 12/2010 | Arduini |
| 2010/0318934 A1 | 12/2010 | Blevins et al. |
| 2011/0022193 A1 | 1/2011 | Panaitescu |
| 2011/0046754 A1 | 2/2011 | Bromley et al. |
| 2011/0071869 A1 | 3/2011 | O'Brien et al. |
| 2011/0072338 A1 | 3/2011 | Caldwell |
| 2011/0098918 A1 | 4/2011 | Siliski et al. |
| 2011/0115816 A1 | 5/2011 | Brackney |
| 2011/0130848 A1 | 6/2011 | Tegnell et al. |
| 2011/0140864 A1 | 6/2011 | Bucci |
| 2011/0144777 A1 | 6/2011 | Firkins et al. |
| 2011/0191277 A1 | 8/2011 | Ag ndez Dominguez et al. |
| 2011/0238189 A1 | 9/2011 | Butera et al. |
| 2011/0258138 A1 | 10/2011 | Kulkarni et al. |
| 2011/0276896 A1 | 11/2011 | Zambetti et al. |
| 2011/0276908 A1 | 11/2011 | O'Riordan |
| 2011/0279323 A1 | 11/2011 | Hung et al. |
| 2011/0282793 A1 | 11/2011 | Mercuri et al. |
| 2011/0295722 A1* | 12/2011 | Reisman ............ G06Q 30/0201 705/27.1 |
| 2012/0004743 A1 | 1/2012 | Anne et al. |
| 2012/0005270 A1 | 1/2012 | Harding et al. |
| 2012/0010758 A1 | 1/2012 | Francino et al. |
| 2012/0011180 A1 | 1/2012 | Kavaklioglu |
| 2012/0011511 A1 | 1/2012 | Horvitz et al. |
| 2012/0029661 A1 | 2/2012 | Jones et al. |
| 2012/0038458 A1 | 2/2012 | Toepke et al. |
| 2012/0040698 A1 | 2/2012 | Ferguson et al. |
| 2012/0078869 A1 | 3/2012 | Bellville et al. |
| 2012/0095574 A1 | 4/2012 | Greenlee |

(56) References Cited

U.S. PATENT DOCUMENTS

| | | |
|---|---|---|
| 2012/0147862 A1 | 6/2012 | Poojary et al. |
| 2012/0163521 A1 | 6/2012 | Kirrmann et al. |
| 2012/0176491 A1 | 7/2012 | Garin et al. |
| 2012/0203728 A1 | 8/2012 | Levine |
| 2012/0226985 A1 | 9/2012 | Chervets et al. |
| 2012/0230309 A1 | 9/2012 | Junk |
| 2012/0239164 A1 | 9/2012 | Smith et al. |
| 2012/0249588 A1 | 10/2012 | Tison et al. |
| 2012/0259436 A1 | 10/2012 | Resurreccion et al. |
| 2012/0271962 A1 | 10/2012 | Ivanov et al. |
| 2012/0290795 A1 | 11/2012 | Dowlatkhah |
| 2012/0331541 A1 | 12/2012 | Hamilton, II et al. |
| 2013/0006696 A1 | 1/2013 | Louie et al. |
| 2013/0007223 A1 | 1/2013 | Luby et al. |
| 2013/0013523 A1 | 1/2013 | Herrera Campos |
| 2013/0029686 A1 | 1/2013 | Moshfeghi |
| 2013/0041479 A1 | 2/2013 | Zhang et al. |
| 2013/0060354 A1 | 3/2013 | Choi et al. |
| 2013/0086591 A1 | 4/2013 | Haven |
| 2013/0095849 A1 | 4/2013 | Pakzad |
| 2013/0120449 A1 | 5/2013 | Ihara et al. |
| 2013/0127980 A1 | 5/2013 | Haddick et al. |
| 2013/0144404 A1 | 6/2013 | Godwin et al. |
| 2013/0144405 A1 | 6/2013 | Lo |
| 2013/0144605 A1 | 6/2013 | Brager et al. |
| 2013/0151563 A1 | 6/2013 | Addepalli et al. |
| 2013/0159200 A1 | 6/2013 | Paul et al. |
| 2013/0169526 A1 | 7/2013 | Gai et al. |
| 2013/0184847 A1 | 7/2013 | Fruh et al. |
| 2013/0197954 A1 | 8/2013 | Yankelevich et al. |
| 2013/0211555 A1 | 8/2013 | Lawson et al. |
| 2013/0212129 A1 | 8/2013 | Lawson et al. |
| 2013/0214902 A1 | 8/2013 | Pineau et al. |
| 2013/0217417 A1 | 8/2013 | Mohideen et al. |
| 2013/0231947 A1 | 9/2013 | Shusterman |
| 2013/0257627 A1 | 10/2013 | Rafael |
| 2013/0265857 A1 | 10/2013 | Foulds et al. |
| 2013/0282150 A1 | 10/2013 | Panther et al. |
| 2013/0318536 A1 | 11/2013 | Fletcher et al. |
| 2014/0006338 A1 | 1/2014 | Watson et al. |
| 2014/0015672 A1 | 1/2014 | Ponce |
| 2014/0039648 A1 | 2/2014 | Boult et al. |
| 2014/0067800 A1 | 3/2014 | Sharma |
| 2014/0079297 A1* | 3/2014 | Tadayon ............... G06K 9/00 |
| | | 382/118 |
| 2014/0089504 A1 | 3/2014 | Scholz et al. |
| 2014/0108985 A1 | 4/2014 | Scott et al. |
| 2014/0122806 A1 | 5/2014 | Lin et al. |
| 2014/0123115 A1 | 5/2014 | Peretz |
| 2014/0123276 A1 | 5/2014 | Bush et al. |
| 2014/0136652 A1 | 5/2014 | Narayanaswami et al. |
| 2014/0156032 A1 | 6/2014 | Jenkins et al. |
| 2014/0164603 A1* | 6/2014 | Castel ................... H04L 41/04 |
| | | 709/224 |
| 2014/0172961 A1 | 6/2014 | Clemmer et al. |
| 2014/0180671 A1 | 6/2014 | Osipova |
| 2014/0180970 A1 | 6/2014 | Hettenkofer et al. |
| 2014/0189520 A1 | 7/2014 | Crepps et al. |
| 2014/0201244 A1 | 7/2014 | Zhou |
| 2014/0232843 A1 | 8/2014 | Campbell |
| 2014/0250153 A1 | 9/2014 | Nixon et al. |
| 2014/0267599 A1 | 9/2014 | Drouin et al. |
| 2014/0273847 A1 | 9/2014 | Nixon et al. |
| 2014/0274123 A1 | 9/2014 | Nixon et al. |
| 2014/0277593 A1 | 9/2014 | Nixon et al. |
| 2014/0277594 A1 | 9/2014 | Nixon et al. |
| 2014/0277595 A1 | 9/2014 | Nixon et al. |
| 2014/0277596 A1 | 9/2014 | Nixon et al. |
| 2014/0277604 A1 | 9/2014 | Nixon et al. |
| 2014/0277605 A1 | 9/2014 | Nixon et al. |
| 2014/0277607 A1 | 9/2014 | Nixon et al. |
| 2014/0277615 A1 | 9/2014 | Nixon et al. |
| 2014/0277616 A1 | 9/2014 | Nixon et al. |
| 2014/0277617 A1 | 9/2014 | Nixon et al. |
| 2014/0277618 A1 | 9/2014 | Nixon et al. |
| 2014/0277656 A1 | 9/2014 | Nixon et al. |
| 2014/0278312 A1 | 9/2014 | Nixon et al. |
| 2014/0280497 A1 | 9/2014 | Nixon et al. |
| 2014/0280678 A1 | 9/2014 | Nixon et al. |
| 2014/0282015 A1 | 9/2014 | Nixon et al. |
| 2014/0282227 A1 | 9/2014 | Nixon et al. |
| 2014/0282257 A1 | 9/2014 | Nixon et al. |
| 2014/0297225 A1 | 10/2014 | Petroski et al. |
| 2014/0316579 A1 | 10/2014 | Taylor et al. |
| 2014/0358256 A1 | 12/2014 | Billi et al. |
| 2014/0359552 A1 | 12/2014 | Misra et al. |
| 2014/0372378 A1 | 12/2014 | Long et al. |
| 2014/0372561 A1 | 12/2014 | Hisano |
| 2014/0379296 A1 | 12/2014 | Nathan et al. |
| 2015/0024710 A1 | 1/2015 | Becker et al. |
| 2015/0067163 A1 | 3/2015 | Bahnsen et al. |
| 2015/0106578 A1 | 4/2015 | Warfield et al. |
| 2015/0172872 A1 | 6/2015 | Alsehly et al. |
| 2015/0177718 A1 | 6/2015 | Vartiainen et al. |
| 2015/0212679 A1 | 7/2015 | Liu |
| 2015/0220080 A1 | 8/2015 | Nixon et al. |
| 2015/0222731 A1 | 8/2015 | Shinohara et al. |
| 2015/0246852 A1 | 9/2015 | Chen et al. |
| 2015/0254330 A1* | 9/2015 | Chan ............... G06F 17/30598 |
| | | 707/613 |
| 2015/0261215 A1 | 9/2015 | Blevins et al. |
| 2015/0277399 A1 | 10/2015 | Maturana et al. |
| 2015/0278397 A1 | 10/2015 | Hendrickson et al. |
| 2015/0296324 A1 | 10/2015 | Garaas et al. |
| 2015/0312721 A1 | 10/2015 | Singh et al. |
| 2015/0332188 A1 | 11/2015 | Yankelevich et al. |
| 2016/0098021 A1 | 4/2016 | Zornio et al. |
| 2016/0098037 A1 | 4/2016 | Zornio et al. |
| 2016/0098388 A1 | 4/2016 | Blevins et al. |
| 2016/0098647 A1 | 4/2016 | Nixon et al. |
| 2016/0132046 A1 | 5/2016 | Beoughter et al. |
| 2016/0261482 A1 | 9/2016 | Mixer et al. |
| 2016/0327942 A1 | 11/2016 | Nixon et al. |
| 2017/0102678 A1 | 4/2017 | Nixon et al. |
| 2017/0102693 A1 | 4/2017 | Kidd et al. |
| 2017/0102694 A1 | 4/2017 | Enver et al. |
| 2017/0102696 A1 | 4/2017 | Bell et al. |
| 2017/0103103 A1 | 4/2017 | Nixon et al. |
| 2017/0115648 A1 | 4/2017 | Nixon et al. |
| 2017/0154395 A1 | 6/2017 | Podgurny et al. |
| 2017/0199843 A1 | 7/2017 | Nixon et al. |
| 2017/0235298 A1 | 8/2017 | Nixon et al. |
| 2017/0236067 A1 | 8/2017 | Tjiong |
| 2017/0238055 A1* | 8/2017 | Chang ................ H04N 13/204 |
| | | 725/19 |
| 2017/0255826 A1* | 9/2017 | Chang ................ H04N 13/204 |
| 2017/0255827 A1* | 9/2017 | Chang ................ H04N 13/204 |
| 2017/0255828 A1* | 9/2017 | Chang ................ H04N 13/204 |
| 2017/0255829 A1* | 9/2017 | Chang ................ H04N 13/204 |
| 2018/0151037 A1 | 5/2018 | Morgenthau et al. |

FOREIGN PATENT DOCUMENTS

| | | |
|---|---|---|
| CN | 1409232 A | 4/2003 |
| CN | 1537258 A | 10/2004 |
| CN | 1589423 A | 3/2005 |
| CN | 1757002 A | 4/2006 |
| CN | 1804744 A | 7/2006 |
| CN | 1805040 A | 7/2006 |
| CN | 1826565 A | 8/2006 |
| CN | 1864156 A | 11/2006 |
| CN | 1980194 A | 6/2007 |
| CN | 101097136 A | 1/2008 |
| CN | 101169799 A | 4/2008 |
| CN | 101187869 A | 5/2008 |
| CN | 101387882 A | 3/2009 |
| CN | 101449259 A | 6/2009 |
| CN | 201374004 Y | 12/2009 |
| CN | 101713985 A | 5/2010 |
| CN | 101788820 A | 7/2010 |
| CN | 101802736 A | 8/2010 |
| CN | 101828195 A | 9/2010 |
| CN | 101867566 A | 10/2010 |
| CN | 102063097 A | 5/2011 |

(56) References Cited

FOREIGN PATENT DOCUMENTS

| | | |
|---|---|---|
| CN | 102124432 A | 7/2011 |
| CN | 102169182 A | 8/2011 |
| CN | 102175174 A | 9/2011 |
| CN | 102184489 A | 9/2011 |
| CN | 102200993 A | 9/2011 |
| CN | 102213959 A | 10/2011 |
| CN | 102239452 A | 11/2011 |
| CN | 102243315 A | 11/2011 |
| CN | 102278987 A | 12/2011 |
| CN | 202101268 U | 1/2012 |
| CN | 102349031 A | 2/2012 |
| CN | 102375453 A | 3/2012 |
| CN | 102378989 A | 3/2012 |
| CN | 102402215 A | 4/2012 |
| CN | 102436205 A | 5/2012 |
| CN | 102494630 A | 6/2012 |
| CN | 102494683 A | 6/2012 |
| CN | 102637027 A | 8/2012 |
| CN | 102640156 A | 8/2012 |
| CN | 102707689 A | 10/2012 |
| CN | 102710861 A | 10/2012 |
| CN | 102801779 A | 11/2012 |
| CN | 102867237 A | 1/2013 |
| CN | 103106188 A | 5/2013 |
| CN | 103403686 A | 11/2013 |
| CN | 103576638 A | 2/2014 |
| CN | 104035392 A | 9/2014 |
| CN | 104049575 A | 9/2014 |
| DE | 19882113 T1 | 1/2000 |
| DE | 19882117 T1 | 1/2000 |
| EP | 0 308 390 A1 | 3/1989 |
| EP | 0 335 957 A1 | 10/1989 |
| EP | 1 344 291 A1 | 9/2003 |
| EP | 1 414 215 A2 | 4/2004 |
| EP | 1 564 647 A2 | 8/2005 |
| EP | 1 912 376 A1 | 4/2008 |
| EP | 2 003 813 A1 | 12/2008 |
| EP | 2 112 614 A1 | 10/2009 |
| EP | 2 180 441 A1 | 4/2010 |
| EP | 2 469 475 A1 | 6/2012 |
| EP | 1 344 291 B1 | 8/2012 |
| EP | 2 685 329 A1 | 1/2014 |
| EP | 2 704 401 A1 | 3/2014 |
| EP | 2 746 884 A1 | 6/2014 |
| EP | 2 801 939 A1 | 11/2014 |
| FR | 2 966 625 A1 | 4/2012 |
| GB | 2 336 977 B | 11/1999 |
| GB | 2 336 923 B | 6/2002 |
| GB | 2 403 028 A | 12/2004 |
| GB | 2 453 426 A | 4/2009 |
| GB | 2 512 984 A | 10/2014 |
| GB | 2 512 997 A | 10/2014 |
| GB | 2 532 849 A | 6/2016 |
| GB | 2 534 628 A | 8/2016 |
| GB | 2 537 457 A | 10/2016 |
| JP | 64-017105 A | 1/1989 |
| JP | 01-291303 A | 11/1989 |
| JP | 05-073131 A | 3/1993 |
| JP | 05-142033 A | 6/1993 |
| JP | 05-187973 A | 7/1993 |
| JP | 06-052145 A | 2/1994 |
| JP | 08-234951 | 9/1996 |
| JP | 09-330861 A | 12/1997 |
| JP | 10-116113 A | 5/1998 |
| JP | 10-326111 A | 12/1998 |
| JP | 11-327628 A | 11/1999 |
| JP | 2000-214914 A | 8/2000 |
| JP | 2001-512593 A | 8/2001 |
| JP | 2001-265821 A | 9/2001 |
| JP | 2002-010489 A | 1/2002 |
| JP | 2002-024423 A | 1/2002 |
| JP | 2002-99325 A | 4/2002 |
| JP | 2003-295944 A | 10/2003 |
| JP | 2003-337794 A | 11/2003 |
| JP | 2004-030492 A | 1/2004 |
| JP | 2004-102765 A | 4/2004 |
| JP | 2004-171127 A | 6/2004 |
| JP | 2004-199624 A | 7/2004 |
| JP | 2004-227561 A | 8/2004 |
| JP | 2004-348582 A | 12/2004 |
| JP | 2005-107758 A | 4/2005 |
| JP | 2005-216137 A | 8/2005 |
| JP | 2005-242830 A | 9/2005 |
| JP | 2005-332093 A | 12/2005 |
| JP | 2006-172462 A | 6/2006 |
| JP | 2006-221376 A | 8/2006 |
| JP | 2006-527426 A | 11/2006 |
| JP | 2007-137563 A | 6/2007 |
| JP | 2007-148938 A | 6/2007 |
| JP | 2007-207065 A | 8/2007 |
| JP | 2007-242000 A | 9/2007 |
| JP | 2007-286798 A | 11/2007 |
| JP | 2007-536631 A | 12/2007 |
| JP | 2007-536648 A | 12/2007 |
| JP | 2008-065821 A | 3/2008 |
| JP | 2008-158971 A | 7/2008 |
| JP | 2008-305419 A | 12/2008 |
| JP | 2009-064451 A | 3/2009 |
| JP | 2009-140380 A | 6/2009 |
| JP | 2009-211522 A | 9/2009 |
| JP | 2009-251777 A | 10/2009 |
| JP | 2010-527486 A | 8/2010 |
| JP | 2011-022920 A | 2/2011 |
| JP | 2011-034564 A | 2/2011 |
| JP | 2011-204237 A | 10/2011 |
| JP | 2011-204238 A | 10/2011 |
| JP | 2012-048762 A | 3/2012 |
| JP | 2012-069118 A | 4/2012 |
| JP | 2012-084162 A | 4/2012 |
| JP | 4-934482 B2 | 5/2012 |
| JP | 2012-215547 A | 11/2012 |
| JP | 2012-527059 A | 11/2012 |
| JP | 2012/252604 A | 12/2012 |
| JP | 2014-116027 A | 6/2014 |
| WO | WO-02/50971 | 6/2002 |
| WO | WO-03/073688 A1 | 9/2003 |
| WO | WO-2003/073688 A1 | 9/2003 |
| WO | WO-2005/083533 A1 | 9/2005 |
| WO | WO-2005/109123 A1 | 11/2005 |
| WO | WO-2008/042786 A2 | 4/2008 |
| WO | WO-2009/021900 A1 | 2/2009 |
| WO | WO-2009/046095 A1 | 4/2009 |
| WO | WO-2011/120625 A1 | 10/2011 |
| WO | WO-2012/016012 A2 | 2/2012 |
| WO | WO-2012/022381 A1 | 2/2012 |
| WO | WO-2012/096877 A1 | 7/2012 |
| WO | WO-2012/129400 A2 | 9/2012 |
| WO | WO-2014/005073 A1 | 1/2014 |
| WO | WO-2014/145801 A2 | 9/2014 |
| WO | WO-2015/138706 A1 | 9/2015 |
| WO | WO-2016/057365 A1 | 4/2016 |

OTHER PUBLICATIONS

U.S. Appl. No. 14/212,411, entitled "Determining Associations and Alignments of Process Elements and Measurements in a Process", filed Mar. 14, 2014, 79 pages.
"Control Loop Foundation—Batch and Continuous Processes", by Terrence Blevins and Mark Nixon, *International Society of Automation*, 2011, Chapter 7.
U.S. Appl. No. 14/174,413, entitled "Collecting and Delivering Data to a Big Data Machine in a Process Control System", filed Feb. 6, 2014, 61 pages.
U.S. Appl. No. 13/784,041, entitled "Big Data in Process Control Systems", filed Mar. 4, 2013, 65 pages.
Search Report for Application No. GB1402311.3, dated Aug. 6, 2014.
Search Report for Application No. GB1403251.0, dated Aug. 8, 2014.
Search Report for Application No. GB1513617.9, dated Jan. 21, 2016.
International Search Report and Written Opinion for Application No. PCT/US2015,053931, dated Jan. 26, 2016.

(56) References Cited

OTHER PUBLICATIONS

Krumeich et al., "Big Data Analytics for Predictive Manufacturing Control—A Case Study from Process Industry," IEEE International Congress on Big Data, pp. 530-537 (2014).
"IoT and Big Data Combine Forces," (2013). Retrieved from the Internet at: URL:http://wiki.advantech.com/images/7/73/iot2013_whitepaper.pdf.
Bryner, "Smart Manufacturing: The Next Revolution," Chemical Engineering Process (2012). Retrieved from the Internet at: URL:http://www.aiche.org/sites/default/files/cep/20121004a.pdf.
Building Smarter Manufacturing with the Internet of Things (IoT), (2014). Retrieved from the Internet at: URL:http://www.cisco.com/web/solutions/trends/iot/iot_in_manufacturing_january.pdf.
International Search Report and Written Opinion for Application No. PCT/US2015/020148, dated Jun. 18, 2015.
Smalley, "GE Invests in Project to Embed Predictive Analytics in Industrial Internet," (2013). Retrieved from the Internet at: URL:http://data-informed.com/ge-invents-in-project-to-embed-predictive-analytics-in-industrial-internet/.
"ANSI/ISA-S5.4-1991 American National Standard Instrument Loop Diagrams" by Instrument Society of America, 1986, 22 pages.
Examination Report for Application No. GB1017192.4, dated May 28, 2014.
Examination Report for Application No. GB1017192.4, dated Sep. 5, 2013.
First Office Action for Chinese Application No. 201010589029.X, dated Dec. 10, 2013.
Notice of Reasons for Rejection for Japanese Application No. 2010-229513, dated Jul. 29, 2014.
Search Report for Application No. GB1017192.4, dated Feb. 15, 2011.
Search Report for Application No. GB1403407.8, dated Aug. 8, 2014.
Search Report for Application No. GB1403408.6, dated Aug. 8, 2014.
Search Report for Application No. GB1403471.4, dated Sep. 9, 2014.
Search Report for Application No. GB1403472.2, dated Aug. 22, 2014.
Search Report for Application No. GB1403474.8, dated Aug. 26, 2014.
Search Report for Application No. GB1403475.5, dated Sep. 3, 2014.
Search Report for Application No. GB1403476.3, dated Aug. 27, 2014.
Search Report for Application No. GB1403477.1, dated Aug. 28, 2014.
Search Report for Application No. GB1403478.9, dated Aug. 21, 2014.
Search Report for Application No. GB1403480.5, dated Aug. 28, 2014.
Search Report for Application No. GB1403615.6, dated Aug. 18, 2014.
Search Report for Application No. GB1403616.4, dated Sep. 1, 2014.
U.S. Appl. No. 14/212,411, filed Mar. 14, 2014, "Determining Associations and Alignments of Process Elements and Measurements in a Process".
U.S. Appl. No. 14/506,863, filed Oct. 6, 2014, "Streaming Data for Analytics in Process Control Systems".
U.S. Appl. No. 14/507,252, filed Oct. 6, 2014, "Automatic Signal Processing-Based Learning in a Process Plant".
U.S. Appl. No. 62/060,408, filed Oct. 6, 2014, "Data Pipeline for Process Control System Analytics".
Communication Relating to the Results of the Partial International Search, dated Jul. 11, 2014.
International Search Report and Written Opinion for Application No. PCT/US2014/030627, dated Sep. 11, 2014.
U.S. Appl. No. 14/028,785, filed Sep. 17, 2013.
U.S. Appl. No. 14/028,897, filed Sep. 17, 2013.
U.S. Appl. No. 14/028,913, filed Sep. 17, 2013.
U.S. Appl. No. 14/028,921, filed Sep. 17, 2013.
U.S. Appl. No. 14/028,923, filed Sep. 17, 2013.
U.S. Appl. No. 14/028,964, filed Sep. 17, 2013.
Bassat et al., "Workflow Management Combined with Diagnostic and Repair Expert System Tools for Maintenance Operations," IEEE, pp. 367-375 (1993).
Search Report for Application No. GB1501042.4, dated Feb. 2, 2016.
Search Report for Application No. GB1517034.3, dated May 26, 2016.
Search Report for Application No. GB1517038.4, dated Mar. 22, 2016.
Examination Report for Application No. EP 14724871.0, dated Aug. 17, 2016.
Adrian et al., "Model Predictive Control of Integrated Unit Operations Control of a Divided Wall Column," Chemical Engineering and Processing: Process Information, 43(3):347-355 (2004).
Daniel et al., "Conceptual Design of Reactive Dividing Wall Columns," Symposium Series No. 152, pp. 364-372 (2006).
Dejanovic et al., "Conceptual Design and Comparison of Four-Products Dividing Wall Columns for Separation of a Multicomponent Aromatics Mixture," Distillation Absorption, pp. 85-90 (2010).
Dongargaonkar et al., "PLC Based Ignition System," Conference Records of the 1999 IEEE Industry Application Conference, 1380-1387 (1999).
Hiller et al., "Multi Objective Optimisation for an Economical Dividing Wall Column Design," Distillation Absorption, pp. 67-72 (2010).
International Preliminary Report on Patentability for Application No. PCT/US2014/030627, dated Sep. 15, 2015.
International Preliminary Report on Patentability for Application No. PCT/US2015/020148, dated Sep. 14, 2016.
Kiss et al., "A control Perspective on Process Intensification in Dividing-Wall Columns," Chemical Engineering and Processing: Process Intensification, 50:281-292 (2011).
Pendergast et al., "Consider Dividing Wall Columns," Chemical Processing (2008). Retrieved from the Internet at: URL:http://www.chemicalprocessing.com/articles/2008/245/?show=all.
Sander et al., "Methyl Acetate Hydrolysis in a Reactive Divided Wall Column," Symposium Series No. 152, pp. 353-363 (2006).
Schultz et al., "Reduce Costs with Dividing-Wall Columns," Reactions and Separations, pp. 64-71 (2002).
Shah et al., "Multicomponent Distillation Configurations with Large Energy Savings," Distillation Absorption, pp. 61-66 (2010).
Thotla et al., "Cyclohexanol Production from Cyclohexene in a Reactive Divided Wall Column: A Feasibility Study," Distillation Absorption, pp. 319-324 (2010).
Tututi-Avila et al., "Analysis of Multi-Loop Control Structures of Dividing-Wall Distillation Columns Using a Fundamental Model," Processes, 2:180-199 (2014).
U.S. Office Action for U.S. Appl. No. 13/784,041 dated Apr. 6, 2015.
U.S. Office Action for U.S. Appl. No. 13/784,041, dated Feb. 26, 2016.
U.S. Office Action for U.S. Appl. No. 13/784,041, dated Oct. 15, 2015.
Hu et al., "Toward Scalable Systems for Big Data Analytics: A Technology Tutorial," IEEE, 2:652-687 (2014).
Lee et al., "Recent Advances and Trends in Predictive Manufacturing Systems in Big Data Environment," Manufacturing Letters, 1(1):38-41 (2013).
Mandavi et al., "Development of a Simulation-Based Decision Support System for Controlling Stochastic Flexible Job Shop Manufacturing Systems," Simulation Modeling Practice and Theory, 18:768-786 (2010).
Mezmaz et al., "A Parallel Bi-Objective Hybrid Metaheuristic for Energy-Aware Scheduling for Cloud Computing Systems," Journal of Parallel and Distributed Computing, Elsevier (2011).
Notification of First Office Action for Chinese Application No. 201480014734.3, dated Apr. 19, 2017.
Razik et al., "The Remote Surveillance Device in Monitoring and Diagnosis of Induction Motor by Using a PDA," IEEE (2007).

(56) References Cited

OTHER PUBLICATIONS

Search Report for Application No. GB1617019.3, dated Feb. 27, 2017.
Siltanen et al., "Augmented Reality for Plant Lifecycle Management," IEEE (2007).
Xu, "From Cloud Computing to Cloud Manufacturing," Robotics and Computer-Integrated Manufacturing 28:75-86 (2012).
Aouada et al., "Source Detection and Separation in Power Plant Process Monitoring: Application of the Bootstrap," IEEE International Conference on Acoustics Speech and Signal Processing Proceedings (2006).
Bruzzone et al., "Different Modeling and Simulation Approaches Applied to Industrial Process Plants," Proceedings of the Emerging M&S Applications in Industry & Academia/Modeling and Humanities Symposium (2013).
First Office Action for Chinese Application No. 201410097675.2, dated May 10, 2017.
International Preliminary Report on Patentability for Application No. PCT/US2015/053931, dated Apr. 11, 2017.
Notification of First Office Action for Chinese Application No. 201410097875.8, dated Jul. 7, 2017.
Sailer et al., "Attestation-Based Policy Enforcement for Remote Access," Proceedings of the 11th ACM Conference on Computer and Communications Security (2004).
Search Report for Application No. GB1617020.1, dated Apr. 13, 2017.
Search Report for Application No. GB1617021.9, dated Apr. 5, 2017.
Search Report for Application No. GB1617022.7, dated Apr. 18, 2017.
Search Report for Application No. GB1617023.5, dated Apr. 7, 2017.
Search Report for Application No. GB16702014.0, dated Aug. 3, 2017.
Sunindyo et al., "An Event-Based Empirical Process Analysis Framework," ESEM (2010).
Notice of Reasons for Rejection for Japanese Application No. 2014-041785, dated Dec. 5, 2017.
Notice of Reasons for Rejection for Japanese Application No. 2014-041785, dated Nov. 30, 2017.
Notice of Reasons for Rejection for Japanese Application No. 2014-048410, dated Dec. 29, 2017.
Notice of Reasons for Rejection for Japanese Application No. 2014-048411, dated Dec. 5, 2017.
Notice of Reasons for Rejection for Japanese Application No. 2014-049918, dated Dec. 12, 2017.
Notice of Reasons for Rejection for Japanese Application No. 2014-049919, dated Nov. 29, 2017.
Notice of Reasons for Rejection for Japanese Application No. 2014-051114, dated Dec. 28, 2017.
Notice of Reasons for Rejection for Japanese Application No. 2014-051596, dated Jan. 9, 2018.
Notice of Reasons for Rejection for Japanese Application No. 2014-051597, dated Jan. 9, 2018.
Extended European Search Report for Application No. 17157505.3, dated Jun. 30, 2017.
First Office Action for Chinese Application No. 201410080524.6, dated Sep. 13, 2017.
First Office Action for Chinese Application No. 201410088828.7, dated Aug. 1, 2017.
First Office Action for Chinese Application No. 201410097623.5, dated Sep. 26, 2017.
First Office Action for Chinese Application No. 201410097873.9, dated Aug. 9, 2017.
First Office Action for Chinese Application No. 201410097874.3, dated Aug. 18, 2017.
First Office Action for Chinese Application No. 201410097921.4, dated Oct. 10, 2017.
First Office Action for Chinese Application No. 201410097922.9, dated Aug. 18, 2017.
First Office Action for Chinese Application No. 201410097923.3, dated Aug. 28, 2017.
First Office Action for Chinese Application No. 201410098326.2, dated Jul. 27, 2017.
First Office Action for Chinese Application No. 201410098327.7, dated Jul. 26, 2017.
First Office Action for Chinese Application No. 201410098982.2, dated Aug. 9, 2017.
First Office Action for Chinese Application No. 201410099103.8, dated Aug. 9, 2017.
Notice of Reasons for Rejection for Japanese Application No. 2014-051599, dated Nov. 28, 2017.
Notification of First Office Action for Chinese Application No. 201410099068.X, dated Sep. 15, 2017.
Decision of Refusal for Japanese Application No. 2014-048410, dated May 29, 2018.
Decision of Rejection for Chinese Application No. 201410097675.2, dated Jul. 2, 2018.
Examination Report for Application No. EP 14724871.0, dated Aug. 10, 2018.
Final Rejection for Japanese Application No. 2014-048410, dated May 29, 2018.
First Office Action for Chinese Application No. 201410097872.4, dated Aug. 23, 2017.
First Office Action for Chinese Application No. 201510049715.0, dated May 4, 2018.
First Office Action for Chinese Application No. 201510113223.3, dated Jul. 4, 2018.
First Office Action for Chinese Application No. 201580014241.4, dated Jun. 22, 2018.
Notice of Reasons for Rejection for Japanese Application No. 2014-048411, dated Jul. 31, 2018.
Notice of Reasons for Rejection for Japanese Application No. 2014-048412, dated Feb. 27, 2018.
Notice of Reasons for Rejection for Japanese Application No. 2014-049915, dated Mar. 13, 2018.
Notice of Reasons for Rejection for Japanese Application No. 2014-049916, dated Feb. 27, 2018.
Notice of Reasons for Rejection for Japanese Application No. 2014-049917, dated Mar. 6, 2018.
Notice of Reasons for Rejection for Japanese Application No. 2014-049918, dated Apr. 10, 2018.
Notice of Reasons for Rejection for Japanese Application No. 2014-049919, dated Jul. 31, 2018.
Notice of Reasons for Rejection for Japanese Application No. 2014-049920, dated Feb. 20, 2018.
Notice of Reasons for Rejection for Japanese Application No. 2014-049920, dated Jun. 5, 2018.
Notice of Reasons for Rejection for Japanese Application No. 2014-051595, dated Jan. 16, 2018.
Notice of Reasons for Rejection for Japanese Application No. 2014-051595, dated May 29, 2018.
Notice of Reasons for Rejection for Japanese Application No. 2014-051596, dated Jan. 16, 2018.
Notice of Reasons for Rejection for Japanese Application No. 2014-051596, dated May 29, 2018.
Notice of Reasons for Rejection for Japanese Application No. 2014-051598, dated Mar. 13, 2018.
Notice of Reasons for Rejection for Japanese Application No. 2016-503431, dated Apr. 3, 2018.
Second Office Action for Chinese Application No. 201410088828.7, dated Apr. 27, 2018.
Second Office Action for Chinese Application No. 201410097623.5, dated Jun. 26, 2018.
Second Office Action for Chinese Application No. 201410097675.2, dated Feb. 11, 2018.
Second Office Action for Chinese Application No. 201410097872.4 dated Jul. 12, 2018.
Second Office Action for Chinese Application No. 201410097873.9, dated May 15, 2018.
Second Office Action for Chinese Application No. 201410097875.8, dated Jun. 6, 2018.

(56) References Cited

OTHER PUBLICATIONS

Second Office Action for Chinese Application No. 201410097921.4, dated Jul. 5, 2018.
Second Office Action for Chinese Application No. 201410097922.9, dated Jan. 9, 2018.
Second Office Action for Chinese Application No. 201410098326.2, dated Jun. 19, 2018.
Second Office Action for Chinese Application No. 201410098327.7, dated Feb. 27, 2018.
Second Office Action for Chinese Application No. 201410098982.2, dated Jun. 11, 2018.
Second Office Action for Chinese Application No. 201410099068.X, dated Jun. 14, 2018.
Second Office Action for Chinese Application No. 201410099103.8, dated Jun. 5, 2018.
Third Office Action for Chinese Application No. 201410097922.9, dated Aug. 3, 2018.
Decision of Refusal for Japanese Application No. 2014-049918, dated Aug. 21, 2018.
Decision of Refusal for Japanese Application No. 2014-051595, dated Sep. 11, 2018.
Decision of Refusal for Japanese Application No. 2014-051596, dated Oct. 23, 2018.
Examination Report for Application No. GB1402311.3, dated Sep. 28, 2018.
Examination Report for Application No. GB14724871.0, dated Oct. 8, 2018.
Final Rejection for Japanese Application No. 2014-049915, dated Nov. 6, 2018.
Notice of Reasons for Rejection for Japanese Application No. 2014-049916, dated Aug. 28, 2018.
Notice of Reasons for Rejection for Japanese Application No. 2014-049917, dated Dec. 4, 2018.
Notice of Reasons for Rejection for Japanese Application No. 2014-049920, dated Oct. 23, 2018.
Notice of Reasons for Rejection for Japanese Application No. 2014-051597, dated Jul. 31, 2018.
Third Office Action for Chinese Application No. 201410098327.7, dated Sep. 30, 2018.
Zhu et al., "Localization Optimization Algorithm of Maximum Likelihood Estimation Based on Received Signal Strength," IEEE 9th International Conference on Communication Software and Networks (ICCSN), pp. 830-834 (2017).

* cited by examiner

DISTRIBUTED BIG DATA IN A PROCESS CONTROL SYSTEM

CROSS REFERENCE TO RELATED APPLICATIONS

This application claims priority to and the benefit of the filing date of U.S. Application No. 61/783,112, entitled "Collecting and Delivering Data to a Big Data Machine in a Process Control System" and filed on Mar. 14, 2013, the entire disclosure of which is hereby incorporated by reference herein. This application is also related to U.S. application Ser. No. 13/784,041, entitled "Big Data in Process Control Systems" and filed on Mar. 7, 2013, the entire disclosure of which is hereby incorporated by reference herein. Additionally, this application is related to U.S. application Ser. No. 14/212,411 (which issued as U.S. Pat. No. 9,804,588), entitled "Determining Associations and Alignments of Process Elements and Measurements in a Process" and filed concurrently herewith, the entire disclosure of which is hereby incorporated by reference herein.

TECHNICAL FIELD

The present disclosure relates generally to process plants and to process control systems, and more particularly, to devices that support distributed big data in process plants and process control systems.

BACKGROUND

Distributed process control systems, like those used in chemical, petroleum or other process plants, typically include one or more process controllers communicatively coupled to one or more field devices via analog, digital or combined analog/digital buses, or via a wireless communication link or network. The field devices, which may be, for example, valves, valve positioners, switches and transmitters (e.g., temperature, pressure, level and flow rate sensors), are located within the process environment and generally perform physical or process control functions such as opening or closing valves, measuring process parameters, etc. to control one or more process executing within the process plant or system. Smart field devices, such as the field devices conforming to the well-known Fieldbus protocol may also perform control calculations, alarming functions, and other control functions commonly implemented within the controller. The process controllers, which are also typically located within the plant environment, receive signals indicative of process measurements made by the field devices and/or other information pertaining to the field devices and execute a controller application that runs, for example, different control modules which make process control decisions, generate control signals based on the received information and coordinate with the control modules or blocks being performed in the field devices, such as HART®, WirelessHART®, and FOUNDATION® Fieldbus field devices. The control modules in the controller send the control signals over the communication lines or links to the field devices to thereby control the operation of at least a portion of the process plant or system.

Information from the field devices and the controller is usually made available over a data highway to one or more other hardware devices, such as operator workstations, personal computers or computing devices, data historians, report generators, centralized databases, or other centralized administrative computing devices that are typically placed in control rooms or other locations away from the harsher plant environment. Each of these hardware devices typically is centralized across the process plant or across a portion of the process plant. These hardware devices run applications that may, for example, enable an operator to perform functions with respect to controlling a process and/or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc. The data highway utilized by the hardware devices, controllers and field devices may include a wired communication path, a wireless communication path, or a combination of wired and wireless communication paths.

As an example, the DeltaV™ control system, sold by Emerson Process Management, includes multiple applications stored within and executed by different devices located at diverse places within a process plant. A configuration application, which resides in one or more workstations or computing devices, enables users to create or change process control modules and download these process control modules via a data highway to dedicated distributed controllers. Typically, these control modules are made up of communicatively interconnected function blocks, which are objects in an object oriented programming protocol that perform functions within the control scheme based on inputs thereto and that provide outputs to other function blocks within the control scheme. The configuration application may also allow a configuration designer to create or change operator interfaces which are used by a viewing application to display data to an operator and to enable the operator to change settings, such as setpoints, within the process control routines. Each dedicated controller and, in some cases, one or more field devices, stores and executes a respective controller application that runs the control modules assigned and downloaded thereto to implement actual process control functionality. The viewing applications, which may be executed on one or more operator workstations (or on one or more remote computing devices in communicative connection with the operator workstations and the data highway), receive data from the controller application via the data highway and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

The architecture of currently known process control plants and process control systems is strongly influenced by limited controller and device memory, communications bandwidth and controller and device processor capability. For example, in currently known process control system architectures, the use of dynamic and static non-volatile memory in the controller is usually minimized or, at the least, managed carefully. As a result, during system configuration (e.g., a priori), a user typically must choose which data in the controller is to be archived or saved, the frequency at which it will be saved, and whether or not compression is used, and the controller is accordingly configured with this limited set of data rules. Consequently, data which could be useful in troubleshooting and process analysis is often not archived, and if it is collected, the useful information may have been lost due to data compression.

Additionally, to minimize controller memory usage in currently known process control systems, selected data that is to be archived or saved (as indicated by the configuration of the controller) is reported to the workstation or computing device for storage at an appropriate data historian or data silo. The current techniques used to report the data poorly utilizes communication resources and induces excessive controller loading. Additionally, due to the time delays in communication and sampling at the historian or silo, the data collection and time stamping is often out of sync with the actual process.

Similarly, in batch process control systems, to minimize controller memory usage, batch recipes and snapshots of controller configuration typically remain stored at a centralized administrative computing device or location (e.g., at a data silo or historian), and are only transferred to a controller when needed. Such a strategy introduces significant burst loads in the controller and in communications between the workstation or centralized administrative computing device and the controller.

Furthermore, the capability and performance limitations of relational databases of currently known process control systems, combined with the previous high cost of disk storage, play a large part in structuring data into independent entities or silos to meet the objectives of specific applications. For example, within the DeltaV™ system, the archiving of process models, continuous historical data, and batch and event data are saved in three different application databases or silos of data. Each silo has a different interface to access the data stored therein.

Structuring data in this manner creates a barrier in the way that historized data is accessed and used. For example, the root cause of variations in product quality may be associated with data in more than of these data silos. However, because of the different file structures of the silos, it is not possible to provide tools that allow this data to be quickly and easily accessed for analysis. Further, audit or synchronizing functions must be performed to ensure that data across different silos is consistent.

The limitations of currently known process plants and process control system discussed above and other limitations may undesirably manifest themselves in the operation and optimization of process plants or process control systems, for instance, during plant operations, trouble shooting, and/or predictive modeling. For example, such limitations force cumbersome and lengthy work flows that must be performed in order to obtain data for troubleshooting and generating updated models. Additionally, the obtained data may be inaccurate due to data compression, insufficient bandwidth, or shifted time stamps.

"Big data" generally refers to a collection of one or more data sets that are so large or complex that traditional database management tools and/or data processing applications (e.g., relational databases and desktop statistic packages) are not able to manage the data sets within a tolerable amount of time. Typically, applications that use big data are transactional and end-user directed or focused. For example, web search engines, social media applications, marketing applications and retail applications may use and manipulate big data. Big data may be supported by a distributed database which allows the parallel processing capability of modern multi-process, multi-core servers to be fully utilized.

SUMMARY

An embodiment of a process control device for supporting distributed big data in a process plant includes a processor and one or more tangible, non-transitory, computer-readable storage media having stored thereon a set of computer-executable instructions. When the computer-executable instructions are executed by the processor, the process control device operates to control, in real-time, at least a portion of a process executed by the process plant by generating process data used to control the at least the portion of the process, and/or by operating on received process data to control the at least the portion of the process. As such, the generated process data and the received process data are process data that is generated from real-time control of the process. The process control device further includes an indication of its type, which may be, for example, a field device, a controller, or an input/output (I/O) device disposed between and connected to the field device and the controller. Additionally, the process control device includes an embedded big data apparatus that is configured to store the generated process data and the received process data, perform a learning analysis on at least a part of the stored process data, create learned knowledge based on a result of the learning analysis, and cause the learned knowledge to be transmitted to another process control device in the process plant.

An embodiment of a method of supporting distributed big data using a device communicatively coupled to a communications network of a process plant and operating to control a process in real-time in the process plant includes collecting data at the device. The collected data includes at least one of: (i) data that is generated by the device, (ii) data that is created by the device, or (iii) data that is received at the device, and the collected data generally is data resulting from the control of the process in real-time. The device is, for example, a field device, a controller, or an input/output (I/O) device. The method further includes storing the collected data in an embedded big data apparatus of the device, and performing, by the embedded big data apparatus of the device, a learning analysis on at least a portion of the stored data. Additionally, the method includes generating learned knowledge indicative of a result of the learning analysis, and modifying, based on the learned knowledge, an operation of the device to control the process in real-time.

An embodiment of a system for supporting distributed big data in a process plant includes a communications network having a plurality of nodes, at least one of which is a process control device operating, in real-time, to control a process executing in the process plant. Each of the plurality of nodes is configured to collect data generated in real-time resulting from control of the process executing in the process plant. Each of the plurality of nodes is also configured to locally store the collected data at a respective embedded big data apparatus included in the each of the plurality of nodes, and to perform, by the respective embedded big data apparatus included in the node, a respective learning analysis on at least a portion of the locally stored data. A node may be further configured to cause learned knowledge (generated as a result of its own performance of a learning analysis) to be transmitted to another node for use in the other node's learning analyses.

DETAILED DESCRIPTION

In process control plants or systems, data is often generated around various process equipment or devices that operate to control a process within the plant or system. In many ways, a first or lowest order of detail for a process in a process control plant or system is related to the input, operation, and output for each piece of process equipment or a collection of process equipment in a control loop of the process, e.g., while the process equipment is operating to control the process. As a result, one possible view or perspective of the process includes big data aggregation around each piece of process equipment or around each control loop. The systems, methods, apparatuses and techniques disclosed herein utilize this localized and distributed perspective of the process to gain efficiencies in operating and optimizing the process, such as by using meaningful, localized and distributed data analytics. For example, instead of analyzing all of the process plant's big data at a single or centralized data warehouse, at least some process control algorithms (including prediction, modeling, and/or diagnostics algorithms) are pushed down to or embedded in individual process equipment to permit real-time operation on localized data. In doing so, process equipment with embedded learning may enable the discovery of important time and causal relationships between various process variables of the process in a fast and efficient manner, and in some cases, in real-time while the process is being controlled.

Figure 1:
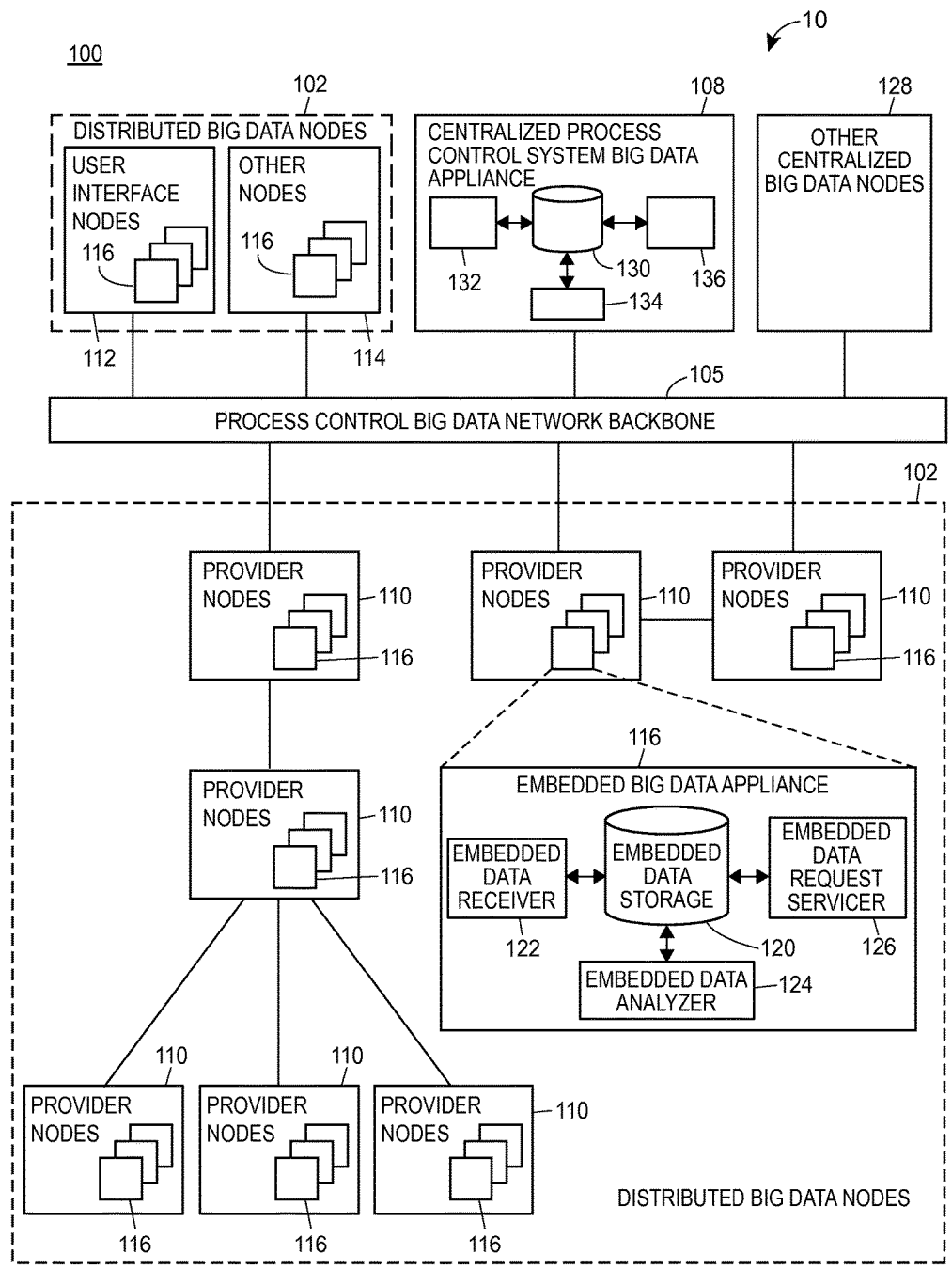
FIG. 1 is a block diagram of an example big data network for a process plant or process control system that includes distributed big data devices or nodes.

FIG. 1 is a block diagram of an example big data network 100 for a process plant or process control system 10. The example big data network 100 includes a plurality of nodes or devices 102 that each support distributed big data, e.g., "distributed big data nodes or devices 102," and that are communicatively connected by a process control system big data network backbone 105. Various types of data such as real-time process-related data, plant-related data, and other types of data may be collected and stored locally at each of the plurality of devices 102. At each of the plurality of devices 102, the locally stored data may be locally analyzed at the device 102 to create or generate learned knowledge that describe meaningful relationships, patterns, correlations, trends, etc., across time and/or across at least some of the various data sets. In an embodiment, at least some of the collected data and/or generated learned knowledge may be delivered between nodes and devices of the network 100, e.g., to be used to improve control of a process in real-time. In some configurations, at least some of the nodes or devices 102 of the network 100 are remotely located from the process plant or system 10.

Any type of data related to the process control system 10 may be collected, analyzed and stored at each of the distributed big data devices 102 as big data. For example, real-time process data such as continuous, batch, measurement and event data that is generated while a process is being controlled in the process plant 10 (and, in some cases, is indicative of an effect of a real-time execution of the process) may be collected, analyzed and stored. Process definition, arrangement or set-up data such as configuration data and/or batch recipe data may be collected, analyzed and stored. Data corresponding to the configuration, execution and results of process diagnostics may be collected, analyzed and stored. Other types of process data may also be collected, analyzed and stored.

Further, data highway traffic and network management data related to the backbone 105 and of various other communications networks of the process plant 10 may be locally collected, analyzed and stored at at least some of the distributed big data devices 102. User-related data such as data related to user traffic, login attempts, queries and instructions may be collected, analyzed and stored. Text data (e.g., logs, operating procedures, manuals, etc.), spatial data (e.g., location-based data) and multi-media data (e.g., closed circuit TV, video clips, etc.) may be collected, analyzed and stored.

In some scenarios, data that is related to the process plant 10 (e.g., to physical equipment included in the process plant 10 such as machines and devices) but that may not be generated by applications that directly configure, control, or diagnose a process may be locally collected, analyzed and stored at at least some of the distributed big data devices 102. For example, vibration data and steam trap data may be collected, analyzed and stored. Other examples of such plant data include data indicative of a value of a parameter corresponding to plant safety (e.g., corrosion data, gas detection data, etc.), or data indicative of an event corresponding to plant safety. Data corresponding to the health of machines, plant equipment and/or devices may be collected, analyzed and stored (e.g., data that is created by the devices and/or machines that is used for diagnostic or prognostic purposes). Data corresponding to the configuration, execution and results of equipment, machine, and/or device diagnostics may be collected, analyzed and stored. Further, created or calculated data that is useful for diagnostics and prognostics may be collected, analyzed and stored.

In some embodiments, data generated by or transmitted to entities external to the process plant 10 may be locally collected, analyzed and stored at at least some of the distributed big data devices 102, such as data related to costs of raw materials, expected arrival times of parts or equipment, and other external data. In an embodiment, all data that is generated by, created by, received at, or otherwise observed by all nodes or devices 102 that are communicatively connected to the network backbone 105 is respectively and locally collected, analyzed and stored at at least some of the nodes or devices 102 as big data.

In some embodiments, various types of data may be automatically collected and stored locally at each of the distributed big data devices 102 as big data. For example, dynamic measurement and control data is automatically collected and stored at the distributed big data devices 102. Examples of dynamic measurement and control data may include data specifying changes in a process operation, data specifying changes in operating parameters such as setpoints, records of process and hardware alarms and events such as downloads or communication failures, etc. In any of these embodiments, all types of measurement and control data are automatically captured in the devices 102 as big data. In addition, static data such as controller configurations, batch recipes, alarms and events may be automatically communicated by default when a change is detected or when a controller or other entity is initially added to the big data network 100.

Moreover, in some scenarios, at least some static metadata that describes or identifies dynamic control and measurement data is captured in the distributed big data devices 102 when a change in the metadata is detected. For example, if a change is made in the controller configuration that impacts the measurement and control data in modules or units that must be sent by the controller, then an update of the associated metadata is automatically captured in the controller. In some situations, parameters associated with the special modules used for buffering data from external systems or sources (e.g., weather forecasts, public events, company decisions, etc.) are automatically captured by default in the devices 102. Additionally or alternatively, surveillance data and/or other types of monitoring data may be automatically captured in the devices 102.

Further, in some embodiments, added parameters created by end users are automatically captured in the distributed big data devices 102. For example, an end user may create a special calculation in a module or may add a parameter to a unit that needs to be collected, or the end user may want to collect a standard controller diagnostic parameter that is not communicated by default. Parameters that the end user optionally configures may be communicated in the same manner as the default parameters.

The plurality of distributed big data nodes or devices 102 of the process control big data network 100 may include several different groups of nodes or devices 110-114 that support distributed big data in process control systems or plants. A first group of nodes or devices 110, referred to interchangeably herein as "distributed big data provider nodes 110," "distributed big data provider devices 110," "provider nodes 110," or "provider devices 110," includes one or more nodes or devices that generate, route, and/or receive process control data to enable processes to be controlled in real-time in the process plant environment 10. Examples of provider nodes or devices 110 include devices whose primary function is directed to generating and/or operating on process control data to control a process, e.g., wired and wireless field devices, controllers, and input/output (I/O devices). Other examples of provider devices 110 include devices whose primary function is to provide access to or routes through one or more communications networks of the process control system (of which the process control big network 100 is one), e.g., access points, routers, interfaces to wired control busses, gateways to wireless communications networks, gateways to external networks or systems, and other such routing and networking devices. Still other examples of provider devices 110 include historian devices whose primary function is to store process data (in some cases, temporarily) and other related data that is accumulated throughout the process control system 10.

At least one of the provider nodes or devices 110 is communicatively connected to the process control big data network backbone 105 in a direct manner. In some process plants, at least one of the provider devices 110 is communicatively connected to the backbone 105 in an indirect manner. For example, a wireless field device is communicatively connected to the backbone 105 via a router, and access point, and a wireless gateway. Further, at least some of the provider nodes or devices 110 may be communicatively connected to the backbone 105 in a hierarchical manner. For example, one or more field devices are communicatively connected to one or more I/O devices, which are communicatively connected to one or more controllers, which in turn are communicatively connected to the backbone 105. Still further, at least one of the provider nodes or devices 110 may be communicatively connected to another provider node or device 110 in a peer-to-peer manner. For example, two controllers are communicatively connected to each other, while one or both of the controllers are also communicatively connected to the backbone 105. Typically, provider nodes or devices 110 do not have an integral user interface, although some of the provider devices 110 may have the capability to be in communicative connection with a user computing device or user interface, e.g., by communicating over a wired or wireless communication link, or by plugging a user interface device into a port of the provider device 110.

A second group of nodes or devices 112 that support distributed big data in process control systems or plants is referred to interchangeably herein as "distributed big data user interface nodes 112," "distributed big data user interface devices 112," "user interface nodes 112" or "user interface devices 112." The second group of devices 112 includes one or more nodes or devices that each have an integral user interface via which a user or operator may interact with the process control system or process plant 10 to perform activities related to the process plant 10 (e.g., configure, view, monitor, test, diagnose, order, plan, schedule, annotate, and/or other activities). Examples of these user interface nodes or devices 112 include mobile or stationary computing devices, workstations, handheld devices, tablets, surface computing devices, and any other computing device having a processor, a memory, and an integral user interface. Integrated user interfaces may include a screen, a keyboard, keypad, mouse, buttons, touch screen, touch pad, biometric interface, speakers and microphones, cameras, and/or any other user interface technology. Each user interface device 112 may include one or more integrated user interfaces. User interface nodes or devices 112 may include a direct connection to the process control big data network backbone 105, or may include an indirect connection to the backbone 105, e.g., via an access point or a gateway. User interface devices 112 may communicatively connect to the process control system big data network backbone 105 in a wired manner and/or in a wireless manner. In some embodiments, a user interface device 112 may connect to the network backbone 105 in an ad-hoc manner.

Of course, the plurality of distributed big data nodes or devices 102 in process control plants and systems is not limited to only provider nodes 110 and user interface nodes 112. One or more other types of distributed big data nodes or devices 114 may also be included in the plurality of nodes or devices 102. For example, a node 114 of a system that is external to the process plant 10 (e.g., a lab system or a materials handling system) may be communicatively connected to the network backbone 105 of the system 100. A node or device 114 may be communicatively connected to the backbone 105 via a direct or an indirect connection, and a node or device 114 may be communicatively connected to the backbone 105 via a wired or a wireless connection. In some embodiments, the group of other nodes or devices 114 may be omitted from the process control system big data network 100.

To support distributed big data, any number of the nodes or devices 110-114 each includes a respective embedded big data apparatus or appliance 116. The embedded big data apparatus or appliance 116 includes, for example, an embedded big data storage 120 for storing or historizing data, one or more processors (not shown), one or more embedded big data receivers 122, one or more embedded big data analyzers 124, and one or more embedded big data request servicers 126. In an embodiment, the embedded big data receivers 122, the embedded big data analyzers 124, and the embedded big data request servicers 126 comprise respective computer-executable instructions that are stored on one or more tangible, non-transitory computer readable storage media (e.g., the embedded big data storage 120, a memory device, or another data storage device), and that are executable by the one or more processors of the embedded big data appliance 116. In some of the nodes or devices 110-114, in addition to executing big data instructions or functions, the one or more processors of the embedded big data appliance 116 additionally execute non-big data instructions or functions that are performed by devices of a process control system, such as control algorithms, data routing, measurements, user interface management, and the like. Each of these components 120, 122, 124, 126 of the embedded big data appliance 116 is described in more detail below. For ease of discussion, the term "particular device 110-114" generally refers to each of one or more of the devices 110-114 that support distributed big data in process plants and process control systems.

The embedded big data storage 120 of a particular device 110-114 includes one or more tangible, non-transitory memory storages that utilize high density memory storage technology, for example, solid state drive memory, semiconductor memory, optical memory, molecular memory, biological memory, or any other suitable high density memory technology. To the other nodes or devices 110-114 of the network 100, the embedded big data storage 120 may have the appearance of a single or unitary logical data storage area or entity, which may or may not be addressed in the network 100 as a different entity from the particular device 110-114. Typically, the embedded big data storage 120 is integrated in the particular device 110-114. In an embodiment, the embedded big data storage 120 includes an integral firewall.

The structure of the embedded big data storage 120 included in the particular device 110-114 supports the storage of any and all process control system and plant related data collected by the particular device 110-114, in an embodiment. Each entry, data point, or observation stored in the embedded big data storage 120 includes, for example, an indication of the identity of the data (e.g., device, tag, location, etc.), a content of the data (e.g., measurement, value, etc.), and a timestamp indicating a time at which the data was collected, generated, created, received, or observed. As such, these entries, data points, or observations are referred to herein as "time-series data." The data is stored in the embedded big data storage 120 of the particular device 110-114 using a common format including a schema that supports scalable storage, for example, and which may or may not be the same schema as utilized by other particular devices 110-114.

In an embodiment, the schema includes storing multiple observations in each row, and using a row-key with a custom hash to filter the data in the row. The hash is based on the timestamp and a tag, in an embodiment. In an example, the hash is a rounded value of the timestamp, and the tag corresponds to an event or an entity of or related to the process control system. In an embodiment, metadata corresponding to each row or to a group of rows is also stored in the embedded big data storage 120 of the particular device 110-114, either integrally with the time-series data or separately from the time-series data. For example, the metadata may be stored in a schema-less manner separately from the time-series data.

In addition to the embedded big data storage 120, the embedded big data appliance 116 of the particular device 110-114 includes one or more embedded big data receivers 122, each of which is configured to receive data collected by the particular device 110-114. In an embodiment, multiple embedded big data receivers 122 (and/or multiple instances of at least one embedded big data receiver 122) may operate in parallel to receive the data locally collected by the particular device 110-114.

Examples of data that may be locally collected and stored by the provider nodes or devices 110, e.g., as distributed big data, may include measurement data, configuration data, batch data, event data, and/or continuous data. For instance, data corresponding to configurations, batch recipes, setpoints, outputs, rates, control actions, diagnostics, health of the device or of other devices, alarms, events and/or changes, and diagnostic data thereto may be collected. Other examples of data may include process models, statistics, status data, and network and plant management data.

Examples of data that may be locally collected and stored by the user interface nodes or devices 112, e.g., as distributed big data, may include, for example, user logins, user queries, data captured by a user (e.g., by camera, audio, or video recording device), user commands, creation, modification or deletion of files, a physical or spatial location of a user interface node or device, results of a diagnostic or test performed by the user interface device 112, and other actions or activities initiated by or related to a user interacting with a user interface node 112.

Collected data may be dynamic or static data. Collected data may include, for example, database data, configuration data, batch data, streaming data, and/or transactional data. Generally speaking, any data that a particular device 110-114 generates, receives, or otherwise observes may be collected with a corresponding time stamp or indication of a time of its generation, reception or observation by the particular device 110-114.

In an embodiment, each of the devices 110, 112 (and, optionally, at least one of the other devices 114) is configured to automatically collect real-time data, without requiring lossy data compression, data sub-sampling, or configuring the node for data collection purposes. Thus, the devices 110, 112 (and, optionally, at least one of the other devices 114) of the process control big data system 100 may automatically collect all data (e.g., measurement and control data as well as various other types of data) that is generated by, created by, received at, or obtained by the device at a rate at which the data is generated, created, received or obtained.

The embedded big data appliance 116 of the particular device 110-114 may include one or more embedded big data analyzers 124, each of which is configured to carry out or perform learning analysis on data stored in the embedded big data storage 120, typically without using any user input to initiate and/or perform the learning analysis. Generally, the learning analysis may be supervised (e.g., determining relationships or patterns from labeled data), semi-supervised (e.g., determining relationships or patterns from unlabeled data and a subset of labeled data), unsupervised (e.g., determining relationships or patterns from unlabeled data), or any combination thereof. In an embodiment, multiple embedded big data analyzers 124 (and/or multiple instances of at least one embedded big data analyzer 124) may operate in parallel to analyze the data stored in the embedded big data storage 120 of the particular device 110-114.

In an embodiment, the embedded big data analyzers 124 may perform large scale data analysis on the stored data (e.g., data mining, data discovery, etc.) to discover, detect, or learn new information and knowledge. For example, data mining generally involves the process of examining large quantities of data to extract new or previously unknown interesting data or patterns such as unusual records or multiple groups of data records. The embedded big data analyzers 124 may also perform large scale data analysis on the stored data (e.g., machine learning analysis, data modeling, pattern recognition, predictive analysis, correlation analysis, etc.) to predict, calculate, or identify implicit relationships or inferences within the stored data. For example, the embedded data analyzers 124 may utilize any number of data learning algorithms and classification techniques such as partial least square (PLS) regression, random forest, and/or principle component analysis (PCA). From the large scale data analysis (e.g., based on outputs of the large scale data analysis), the embedded big data analyzers 124 of the particular device 110-114 may create or generate ensuing learned knowledge, which may be stored in or added to the embedded big data storage 120 of the particular device 110-114.

Furthermore, the embedded big data appliance 116 of the particular device 110-114 may include one or more embedded big data request servicers 126, each of which is configured to access localized data stored in the embedded big data storage 120, e.g., per the request of a requesting entity or application. In an embodiment, multiple embedded big data request servicers 126 (and/or multiple instances of at least one embedded big data request servicer 126) of the particular device 110-114 may operate in parallel on multiple requests from multiple requesting entities or applications. In an embodiment, a single embedded big data request servicer 126 of the particular device 110-114 may service multiple requests, such as multiple requests from a single entity or application, or multiple requests from different instances of an application.

Continuing with FIG. 1, the process control system big data network backbone 105 comprises a plurality of networked computing devices or switches that are configured to route packets to/from various distributed big data devices 102 of the process control system big data network 100. The plurality of networked computing devices of the backbone 105 may be interconnected by any number of wireless and/or wired links. In an embodiment, the process control system big data network backbone 105 includes one or more firewall devices.

The big data network backbone 105 may support one or more suitable routing protocols, e.g., protocols included in the Internet Protocol (IP) suite (e.g., UPD (User Datagram Protocol), TCP (Transmission Control Protocol), Ethernet, etc.), or other suitable routing protocols. Typically, each device or node 102 included in the process data big data network 100 supports at least an application layer (and, for some devices, additional layers) of the routing protocol(s) supported by the backbone 105. In an embodiment, each device or node 102 is uniquely identified within the process control system big data network 100, e.g., by a unique network address. In an embodiment, at least a portion of the process control system big data network 100 is an ad-hoc network. As such, at least some of the devices 102 may connect to the network backbone 105 (or to another node of the network 100) in an ad-hoc manner.

Referring again to FIG. 1, in some embodiments, the example process control system big data process control network 100 includes a centralized process control system big data apparatus or appliance 108, which is configured to receive and store collected data and/or generated learned knowledge from the distributed big data devices or nodes 102 (e.g., via streaming and/or via some other protocol) of the network 100, as well as from other big data devices or nodes 128 that support big data in a centralized manner (e.g., devices or nodes that are non-distributed or centralized big data devices or nodes). The process control system big data appliance 108 may also be configured to further analyze any or all of the received data and learned knowledge received from distributed big data nodes 102 and from centralized big data nodes 128. As such, the centralized process control system big data apparatus or appliance 108 may include a centralized process control system big data storage area 130, a plurality of centralized process control system big data receivers 132, a plurality of centralized process control system big data analyzers 134, and a plurality of centralized process control system big data request servicers 136. Each of the centralized components 130, 132, 134, 136 of the centralized process control system big data appliance 108 may be similar to the distributed components 120, 122, 124, 126 of the embedded big data appliance 116 as previously described above.

In an embodiment, the centralized process control system big data appliance 108 is similar to that described in aforementioned U.S. application Ser. No. 13/784,041. For example, the centralized process control system big data storage area 130 may comprise multiple physical data drives or storage entities, such as RAID (Redundant Array of Independent Disks) storage, cloud storage, or any other suitable data storage technology that is suitable for data bank or data center storage. Further, each of the plurality of centralized process control system big data receivers 132 may be configured to receive data packets from the backbone 105, process the data packets to retrieve the substantive data and/or learned knowledge carried therein, and store the substantive data and/or learned knowledge in the centralized process control system big data storage area 130. In an embodiment, the schema used for storing data and/or learned knowledge at one or more of the t embedded big data storages 120 in the network 100 is also utilized for storing data and/or learned knowledge in the centralized process control system big data storage area 130. Accordingly, in this embodiment, the schema is maintained when data and/or learned knowledge are transmitted from the one or more embedded big data storages 120 across the backbone 105 to the centralized process control system big data storage area 130. In an embodiment, at least some of the distributed big data devices 102 utilize a streaming protocol such as the Stream Control Transmission Protocol (SCTP) to stream stored data and/or learned knowledge from the devices 102 to the centralized process control system big data appliance 108 via the network backbone 105.

With regard to the centralized big data nodes or devices 128, the centralized big data nodes or devices 128 may be similar to those devices described in aforementioned U.S. Application No. 61/783,112. For example, the centralized big data nodes or devices 128 each include a multi-core processor and a cache memory that is configured to temporarily store or cache data that is generated by, created by, received at, or otherwise observed by its respective device 128. The multi-core processor of the centralized big data device 128 is configured to cause the cached data to be transmitted for storage at the centralized process control system big data appliance 108.

Furthermore, in some embodiments, the example process control system big data process control network 100 may include legacy or prior art process control devices (not shown) that do not include any big data support. In these embodiments, a gateway node in the plant 10 may convert or translate data messages between a protocol utilized by big data backbone 105 and a different protocol utilized by a communication network to which the legacy or prior art devices are communicatively connected.

Figure 2:
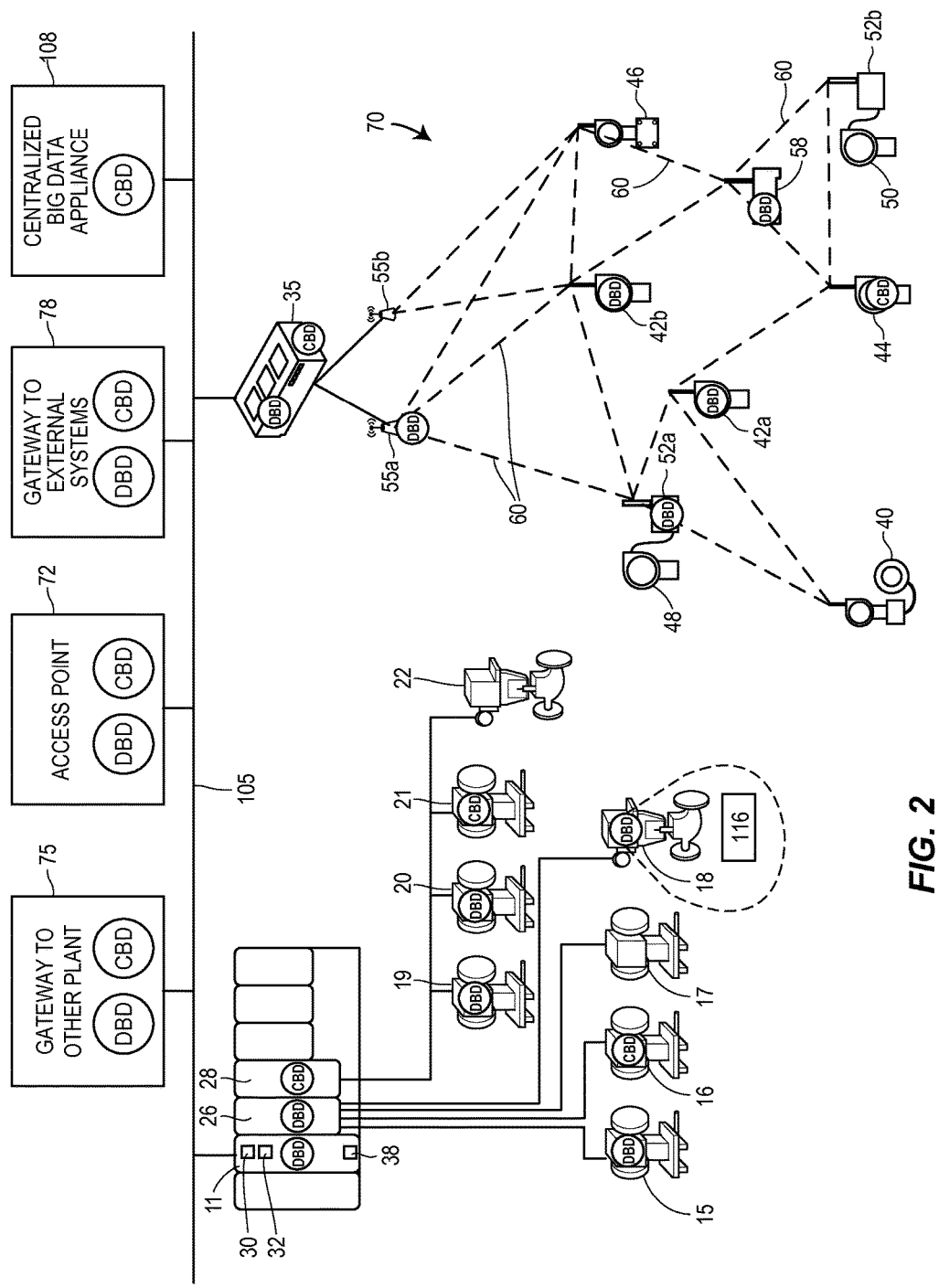
FIG. 2 is a block diagram illustrating an example process plant or process control system that includes example distributed big data devices or nodes of the process control system big data network of FIG. 1.

A detailed block diagram illustrating example distributed big data provider devices 110 in a process plant or process control environment is shown in FIG. 2. Example distributed big data provider devices 110 are indicated in FIG. 2 using a "DBD" reference, signifying the inclusion of a respective embedded big data appliance 116 therein. While the devices 110 are discussed with reference to the process plant or process control system 10 of FIG. 1, the example distributed big data provider devices 110 may be used in or with other process plants or process control systems to support distributed big data therein.

As previously discussed, the distributed big data provider devices 110 may include devices whose main function is to locally automatically generate and/or receive process control data that is used to perform functions to control a process in real-time in the process plant environment 10, and locally store or historize said data. For instance, process controllers, field devices and I/O devices are examples of possible distributed big data providers 110. In a process plant environment 10, process controllers receive signals indicative of process measurements made by field devices, process this information to implement a control routine, and generate control signals that are sent over wired or wireless communication links to other field devices to control the operation of a process in the plant 10. Typically, at least one field device performs a physical function (e.g., opening or closing a valve, increase or decrease a temperature, etc.) to control the operation of a process, and some types of field devices may communicate with controllers using I/O devices. Process controllers, field devices, and I/O devices may be wired or wireless, and any number and combination of wired and wireless process controllers, field devices and I/O devices may be distributed big data nodes 110 of the process control big data network 100, each of which locally collects, analyzes and stores big data.

For example, FIG. 2 illustrates a distributed big data process controller device 11 that locally collects, analyzes and stores big data of the process control network or plant 10. The controller 11 is communicatively connected to wired field devices 15-22 via input/output (I/O) cards 26 and 28, and is communicatively connected to wireless field devices 40-46 via a wireless gateway 35 and the network backbone 105. (In another embodiment, though, the controller 11 may be communicatively connected to the wireless gateway 35 using a communications network other than the backbone 105, such as by using another wired or a wireless communication link.) In FIG. 2, the controller 11 is a distributed big data provider node 110 of the process control system big data network 100 (as signified by the DBD label), and is directly connected to the process control big data network backbone 105.

The controller 11, which may be, by way of example, the DeltaV™ controller sold by Emerson Process Management, may operate to implement a batch process or a continuous process using at least some of the field devices 15-22 and 40-46. In an embodiment, in addition to being communicatively connected to the process control big data network backbone 105, the controller 11 may also be communicatively connected to at least some of the field devices 15-22 and 40-46 using any desired hardware and software associated with, for example, standard 4-20 mA devices, I/O cards 26, 28, and/or any smart communication protocol such as the FOUNDATION® Fieldbus protocol, the HART® protocol, the WirelessHART® protocol, etc. In an embodiment, the controller 11 may be communicatively connected with at least some of the field devices 15-22 and 40-46 using the big data network backbone 105. In FIG. 2, the controller 11, the field devices 15-22 and the I/O cards 26, 28 are wired devices, and the field devices 40-46 are wireless field devices. Of course, the wired field devices 15-22 and wireless field devices 40-46 could conform to any other desired standard(s) or protocols, such as any wired or wireless protocols, including any standards or protocols developed in the future.

The process controller device 11 of FIG. 2 includes a processor 30 that implements or oversees one or more process control routines (e.g., that are stored in a memory 32), which may include control loops. The processor 30 is configured to communicate with the field devices 15-22 and 40-46 and with other nodes (e.g., nodes 110, 112, 114) that are communicatively connected to the backbone 105. It should be noted that any control routines or modules (including quality prediction and fault detection modules or function blocks) described herein may have parts thereof implemented or executed by different controllers or other devices if so desired. Likewise, the control routines or modules described herein which are to be implemented within the process control system 10 may take any form, including software, firmware, hardware, etc. Control routines may be implemented in any desired software format, such as using object oriented programming, ladder logic, sequential function charts, function block diagrams, or using any other software programming language or design paradigm. The control routines may be stored in any desired type of memory, such as random access memory (RAM), or read only memory (ROM) Likewise, the control routines may be hard-coded into, for example, one or more EPROMs, EEPROMs, application specific integrated circuits (ASICs), or any other hardware or firmware elements. Thus, the controller 11 may be configured to implement a control strategy or control routine in any desired manner.

In some embodiments, the controller 11 implements a control strategy using what are commonly referred to as function blocks, wherein each function block is an object or other part (e.g., a subroutine) of an overall control routine and operates in conjunction with other function blocks (via communications called links) to implement process control loops within the process control system 10. Control based function blocks typically perform one of an input function, such as that associated with a transmitter, a sensor or other process parameter measurement device, a control function, such as that associated with a control routine that performs PID, fuzzy logic, etc. control, or an output function which controls the operation of some device, such as a valve, to perform some physical function within the process control system 10. Of course, hybrid and other types of function blocks exist. Function blocks may be stored in and executed by the controller 11, which is typically the case when these function blocks are used for, or are associated with standard 4-20 ma devices and some types of smart field devices such as HART devices, or may be stored in and implemented by the field devices themselves, which can be the case with Fieldbus devices. The controller 11 may include one or more control routines 38 that may implement one or more control loops. Each control loop is typically referred to as a control module, and may be performed by executing one or more of the function blocks.

Other examples of provider devices 110 that support distributed big data in the process plant or system 10 are the wired field devices 15, and 18-20 and the I/O card 26 shown in FIG. 2. As such, at least some of the wired field devices 15, 18-20 and the I/O card 26 may be distributed big data nodes 102 of the process control system big data network 100. Additionally, FIG. 2 demonstrates that wired centralized big data devices (e.g., wired field devices 16, 21 and I/O card 28, as indicated in FIG. 2 by the reference "CBD") and wired legacy devices (e.g., devices 17 and 22) may operate in conjunction with the wired distributed big data devices 15, 18-20, 26 within the process plant. The wired field devices 15-22 may be any types of devices, such as sensors, valves, transmitters, positioners, etc., while the I/O cards 26 and 28 may be any types of I/O devices conforming to any desired communication or controller protocol. In FIG. 2, the field devices 15-18 are standard 4-20 mA devices or HART devices that communicate over analog lines or combined analog and digital lines to the I/O card 26, while the field devices 19-22 are smart devices, such as FOUNDATION® Fieldbus field devices, that communicate over a digital bus to the I/O card 28 using a Fieldbus communications protocol. In some embodiments, though, at least some of the big data wired field devices 15, 16 and 18-21 and/or at least some of the big data I/O cards 26, 28 additionally or alternatively communicate with the controller 11 using the big data network backbone 105.

The wireless field devices 40-46 shown in FIG. 2 include examples of wireless provider devices 110 that support distributed big data in the process plant or system 10 (e.g., devices 42a and 42b). FIG. 2 also includes an example of a wireless centralized big data devices (e.g., device 44) as well as an example of a legacy wireless device (e.g., device 46). In FIG. 2, the wireless field devices 40-46 communicate in a wireless network 70 using a wireless protocol, such as the WirelessHART protocol. Such wireless field devices 40-46 may directly communicate with one or more other devices or nodes (e.g., distributed big data nodes 102, centralized big data nodes 128, or other nodes) of the process control big data network 100 that are also configured to communicate wirelessly (using the wireless protocol, for example). To communicate with one or more other nodes (e.g., distributed big data nodes 102, centralized big data nodes 128, or other nodes) that are not configured to communicate wirelessly, the wireless field devices 40-46 may utilize a wireless gateway 35 connected to the backbone 105 or to another process control communications network. Any number of wireless field devices that support distributed big data may be utilized in a process plant 10.

In an embodiment, the wireless gateway 35 is a distributed big data provider device 110 that is included in the process control plant or system 10. The wireless gateway 35 may provide access to various wireless devices 40-58 of a wireless communications network 70. In particular, the wireless gateway 35 provides communicative coupling between the wireless devices 40-58, the wired devices 11-28, and/or other nodes or devices of the process control big data network 100 (including the controller 11 of FIG. 2). For example, the wireless gateway 35 may provide communicative coupling by using the big data network backbone 105 and/or by using one or more other communications networks of the process plant 10. The wireless gateway 35 may support distributed big data, centralized big data, or both distributed big data and centralized big data, and in some process plants, the wireless gateway 35 is a node 110 of the process control system big data network 100.

The wireless gateway 35 provides communicative coupling, in some cases, by the routing, buffering, and timing services to lower layers of the wired and wireless protocol stacks (e.g., address conversion, routing, packet segmentation, prioritization, etc.) while tunneling a shared layer or layers of the wired and wireless protocol stacks. In other cases, the wireless gateway 35 may translate commands between wired and wireless protocols that do not share any protocol layers. In addition to protocol and command conversion, the wireless gateway 35 may provide synchronized clocking used by time slots and superframes (sets of communication time slots spaced equally in time) of a scheduling scheme associated with the wireless protocol implemented in the wireless network 70. Furthermore, the wireless gateway 35 may provide network management and administrative functions for the wireless network 70, such as resource management, performance adjustments, network fault mitigation, monitoring traffic, security, and the like.

Similar to the wired field devices 15-22, the wireless field devices 40-46 of the wireless network 70 may perform physical control functions within the process plant 10, e.g., opening or closing valves or take measurements of process parameters. The wireless field devices 40-46, however, are configured to communicate using the wireless protocol of the network 70. As such, the wireless field devices 40-46, the wireless gateway 35, and other wireless nodes 52-58 of the wireless network 70 are producers and consumers of wireless communication packets.

In some scenarios, the wireless network 70 may include non-wireless devices. For example, a field device 48 of FIG. 2 may be a legacy 4-20 mA device and a field device 50 may be a traditional wired HART device. To communicate within the network 70, the field devices 48 and 50 may be connected to the wireless communications network 70 via a wireless adaptor (WA) 52a or 52b. In FIG. 2, the wireless adaptor 52b is shown as being a legacy wireless adaptor that communicates using the wireless protocol, and the wireless adaptor 52a is shown as supporting distributed big data and thus is communicatively connected to the big data network backbone 105. Additionally, the wireless adaptors 52a, 52b may support other communication protocols such as Foundation® Fieldbus, PROFIBUS, DeviceNet, etc. Furthermore, the wireless network 70 may include one or more network access points 55a, 55b, which may be separate physical devices in wired communication with the wireless gateway 35 or may be provided with the wireless gateway 35 as an integral device. In FIG. 2, the network access point 55a is illustrated as being a distributed big data device 110, while the network access point 55b is a legacy access point. The wireless network 70 may also include one or more routers 58 to forward packets from one wireless device to another wireless device within the wireless communications network 70, each of which may or may not support distributed big data in the process control system 10. The wireless devices 40-46 and 52-58 may communicate with each other and with the wireless gateway 35 over wireless links 60 of the wireless communications network 70, and/or via the big data network backbone 105, if the wireless devices are distributed and/or centralized big data devices.

Accordingly, FIG. 2 includes several examples of distributed big data provider devices 110 which primarily serve to provide network routing functionality and administration to various networks of the process control system. For example, the wireless gateway 35, the access point 55a, and the router 58 each may include functionality to route wireless packets in the wireless communications network 70. The wireless gateway 35 performs traffic management and administrative functions for the wireless network 70, as well as routes traffic to and from wired networks that are in communicative connection with the wireless network 70. The wireless network 70 may utilize a wireless process control protocol that specifically supports process control messages and functions, such as WirelessHART. As shown in FIG. 2, the devices 35, 55a, 52a, 42a, 42b and 58 of the wireless network 70 support distributed big data in the process control plant or network 10, however, any number of any types of nodes of the wireless network 70 may support distributed big data in the process plant 10.

The distributed big data provider devices 110 of the process control big data network 100, though, may also include other devices that communicate using other wireless protocols. In FIG. 2, the distributed big data provider devices or nodes 110 include one or more wireless access points 72 that utilize other wireless protocols, such as WiFi or other IEEE 802.11 compliant wireless local area network protocols, mobile communication protocols such as WiMAX (Worldwide Interoperability for Microwave Access), LTE (Long Term Evolution) or other ITU-R (International Telecommunication Union Radiocommunication Sector) compatible protocols, short-wavelength radio communications such as near field communications (NFC) and Bluetooth, or other wireless communication protocols. Typically, such wireless access points 72 allow handheld or other portable computing devices (e.g., user interface devices 112) to communicative over a respective wireless network that is different from the wireless network 70 and that supports a different wireless protocol than the wireless network 70. In some scenarios, in addition to portable computing devices, one or more process control devices (e.g., controller 11, field devices 15-22, or wireless devices 35, 40-58) may also communicate using the wireless protocol supported by the access points 72. In an embodiment, at least some of the wireless access points 72 also support centralized big data.

In FIG. 2, the provider devices or nodes 110 that support distributed big data in the process plant or system 10 include one or more gateways 75, 78 to systems that are external to the immediate process control system 10. Typically, such systems are customers or suppliers of information generated or operated on by the process control system 10. For example, a plant gateway node 75 may communicatively connect the immediate process plant 10 (having its own respective process control big data network backbone 105) with another process plant having its own respective process control big data network backbone. In an embodiment, a single process control big data network backbone 105 may service multiple process plants or process control environments. In an embodiment, at least some of the gateways 75, 78 also support centralized big data.

Also in FIG. 2, a plant gateway node 75 that supports distributed big data in the process plant or system 10 communicatively connects the immediate process plant 10 to a legacy or prior art process plant that does not include a process control big data network 100 or backbone 105. In this example, the plant gateway node 75 may convert or translate messages between a protocol utilized by the process control big data backbone 105 of the plant 10 and a different protocol utilized by the legacy system (e.g., Ethernet, Profibus, Fieldbus, DeviceNet, etc.).

The distributed big data provider devices or nodes 110 in the process plant or system 10 may include one or more external system gateway nodes 78 to communicatively connect the process control big data network 100 with the network of an external public or private system, such as a laboratory system (e.g., Laboratory Information Management System or LIMS), an operator rounds database, a materials handling system, a maintenance management system, a product inventory control system, a production scheduling system, a weather data system, a shipping and handling system, a packaging system, the Internet, another provider's process control system, or other external systems.

Although FIG. 2 only illustrates a single controller 11 with a finite number of field devices 15-22 and 40-46, this is only an illustrative and non-limiting embodiment. Any number of controllers 11 may be included in the provider devices or nodes 110 of the process control big data network 100, and any of the controllers 11 may communicate with any number of wired or wireless field devices 15-22, 40-46 to control a process in the plant 10. Furthermore, the process plant 10 may also include any number of wireless gateways 35, routers 58, access points 55, wireless process control communications networks 70, access points 72, and/or gateways 75, 78. Still further, FIG. 2 may include a centralized big data appliance 108, which may receive and store collected data and/or generated learned knowledge from any or all of the big data devices CBD, DBD in the process plant 10.

Referring generally to the distributed big data devices illustrated in FIG. 2 and indicated by the label "DBD," as discussed previously, each of said devices includes a respective embedded big data appliance 116 including a respective embedded big data storage 120, a respective embedded big data receiver 122, a respective embedded big data analyzer 124, and a respective embedded big data request servicer 126. As such, data collected by each distributed big data provider device 110 may be received by its embedded big data receiver 122 and stored in its embedded big data storage 120. Further, each distributed big data provider device 110 may utilize its embedded big data analyzer 124 to analyze the stored data to generate learned knowledge that describe meaningful patterns, correlations, trends, etc., in the stored data. Still further, each distributed big data provider device 110 may utilize its embedded big data request servicers 126 to access the stored data per the request of a requesting entity or application.

Figure 3:
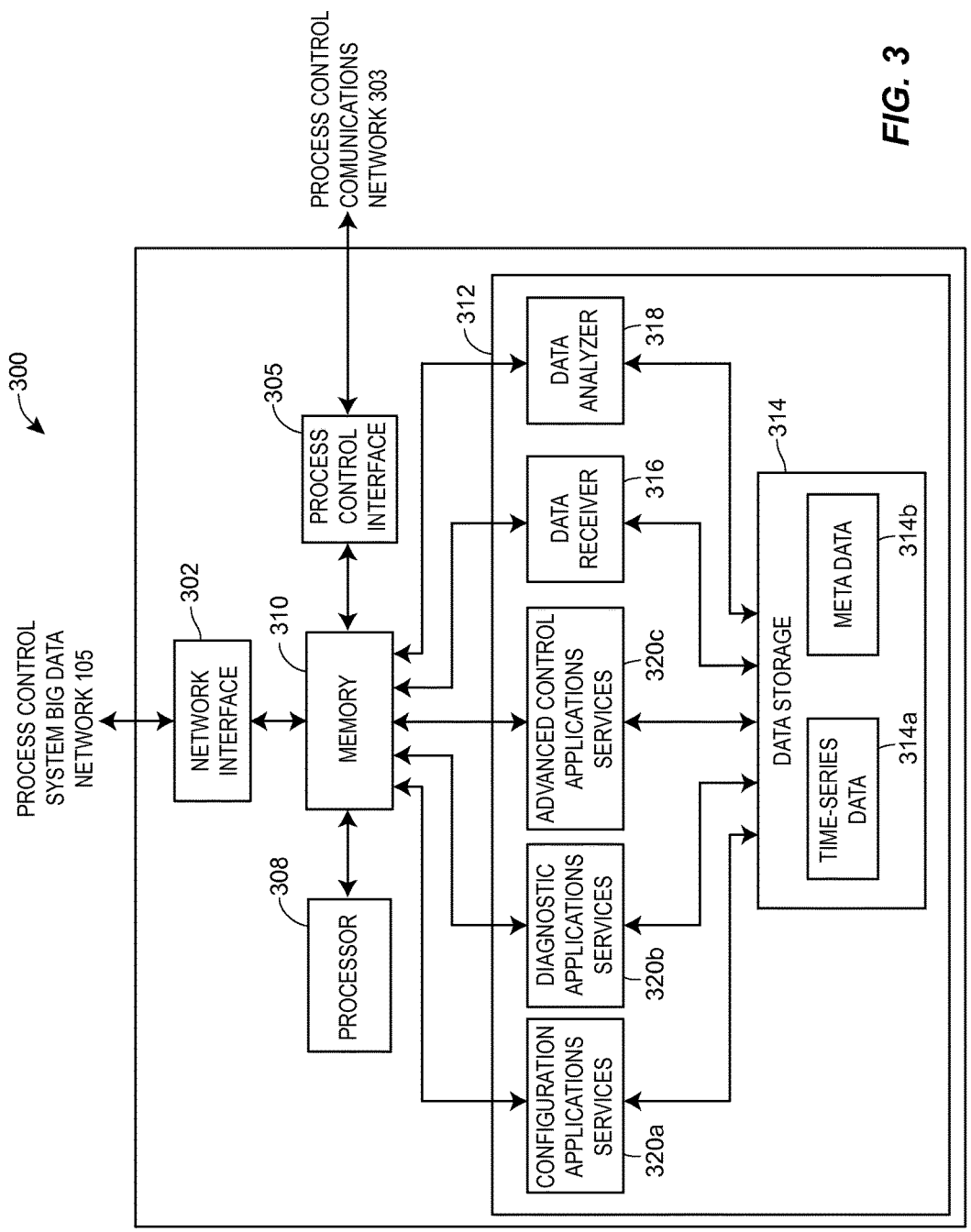
FIG. 3 is a block diagram of an example distributed big data device in process control systems or plants.

FIG. 3 depicts a block diagram of an example device 300 that supports distributed big data in process plants or systems, such as the process plant 10 of FIG. 1 or other suitable process plants or systems. For example, the device 300 is similar to one of the distributed big data provider nodes or devices DBD illustrated in FIG. 2. For example, the device 300 may be a process controller (e.g., the controller 11), a field device (e.g., one of the field devices 15, 18, 19, 20, 42a, or 42b), an I/O device (e.g., the I/O cards 26), or a networking or network management device (e.g., the wireless gateway 35, the router 58, the access point 72). In an embodiment, the device 300 is a user interface device (e.g., one of the distributed big data user interface nodes or devices 112 in FIG. 1), or the device 300 is another type of device distributed big data 114. It is noted that FIG. 3 is discussed below with reference to FIGS. 1 and 2 for ease of discussion, and not for limitation purposes.

The distributed big data device 300 may be a node of a network that supports distributed big data in a process control system, such as the process control system big data network 100 of FIG. 1 or another suitable network. As such, the device 300 may be communicatively coupled to a process control system big data network backbone, such as the backbone 105. For example, the device 300 is coupled to the process control system big data network backbone 105 using a network interface 302. In some process plants, one or more distributed big data devices included therein may be stand-alone, and thus are not connected to the big data network backbone 105.

In an embodiment, the device 300 operates in the process plant or process control system 10 to control a process in real-time, e.g., as part of a control loop. For example, the device 300 connects, using a process control interface 305, to a process control communications network 303 via which the device 300 may transmit signals to and/or receive signals from other devices to control a process in real-time in the process control system 10. The process control communications network 303 may be a wired or wireless communications network (e.g., the wireless network 70, a Fieldbus network, a wired HART network, etc.), or the process control communications network 303 may include both a wired and a wireless communications network. Additionally or alternatively, the device 300 may transmit and/or receive signals to control the process in real-time using the process control big data network backbone 105, e.g., via the network interface 302. In an embodiment, the network interface 302 and the process control interface 305 may be the same interface (e.g., an integral interface).

The process control interface 305 is configured to transmit and/or receive process control data corresponding to a process of the process plant 10 or to a process being controlled in the process plant 10. Process control data may include measurement data (e.g., outputs, rates, etc.), configuration data (e.g., setpoints, configuration changes, etc.), batch data (e.g., batch recipes, batch conditions, etc.), event data (e.g., alarms, process control events, etc.), continuous data (e.g., parameter values, video feeds, etc.), calculated data (e.g., internal states, intermediate calculations, etc.), diagnostic data, data indicative of the health of the device 300 or of another device, and/or other kinds of process control data. Further, the process control data may include data created by the device 300 itself, e.g., as a result of performing a control function.

In an embodiment, the distributed big data device 300 is a process controller and the process control interface 305 is used to obtain a configuration of the controller (e.g., from a workstation), and/or to obtain data that is transmitted to or received from a field device connected to the controller to control a process in real-time. For example, the controller may be connected to a wireless HART valve positioner, the valve positioner may generate process control data corresponding to a state of the valve and provide the generated data to the controller via the process control interface 305. The received data may be stored in the controller and/or may be used by the controller to perform a control function or at least a portion of a control loop.

In another embodiment, the distributed big data device 300 is an I/O device that provides a connection between a controller and a field device. In this embodiment, the process control interface 305 includes a field device interface to exchange process control data with the field device, and a controller interface to exchange process control data with the controller. The field device interface is connected to the controller interface so that data may be transmitted to and received from the field device to the controller via the I/O device.

In yet another embodiment, the distributed big data device 300 is a field device performing a physical function to control a process. For example, the device 300 may be a flow meter that measures and obtains process control data corresponding to a current measured flow via the process control interface 305, and that sends a signal corresponding to the measured flow to a controller to control a process via the interface 305.

Although the above discussion refers to the distributed big data device 300 as being a process control device operating in a control loop, the techniques and descriptions provided above apply equally to embodiments in which the device 300 is another type of device associated with the process control plant or system 10. In an example, the distributed big data device 300 is a network management device such as an access point 72. The network management device observes data (e.g., bandwidth, traffic, types of data, network configuration, login identities and attempts, etc.) via the interface 305, and relays the generated data to the process control system big data network backbone 105 via the network interface 302. In yet another example, the device 300 is a distributed big data user interface device 112 (e.g., a mobile device, a tablet, etc.) that is configured to allow a user or operator to interact with the process control system or process plant 10. For instance, the interface 305 in the device 300 may be an interface to a WiFi or NFC communications link that allows the user to perform activities in the process plant 10 such as configuration, viewing, scheduling, monitoring, etc. User logins, commands, and responses may be collected via the interface 305 and transmitted to the process control system big data network backbone 105 via the network interface 302.

In addition to the interfaces 302, 305, the distributed big data device 300 includes a processor 308 configured to execute computer-readable instructions stored in a memory 310, and an embedded big data appliance 312. The processor 308 includes processing elements such as central processing units (CPU). In an embodiment, the processor 308 has a single processing element. In an embodiment, the processor 308 has multiple processing elements that are able to perform multiple tasks or functions concurrently or in parallel by allocating multiple calculations across the multiple processing elements. In any event, the processor 308 may cause data to be collected or captured, e.g., data that traverses the interface 305. For example, the processor 308 may collect data that is directly generated by the device 300, that is created by the device 300, or that is directly received at the device 300. The processor 308 may also operate the device 300 to control a process in real-time (e.g., to send and/or receive real-time process data and/or implement control routines to control a process) in the process plant 10.

The memory 310 of the device 300 stores one or more sets of computer-readable or computer-executable instructions that are executable by the processor 308. As such, the memory 310 includes one or more tangible, non-transitory computer-readable storage media. The memory 310 may be implemented as one or more semiconductor memories, magnetically readable memories, optically readable memories, molecular memories, cellular memories, and/or the memory 310 may utilize any other suitable tangible, non-transitory computer-readable storage media or memory storage technology.

The device 300 may collect dynamic measurement and control data, as well as various other types of data, without requiring any user provided information that identifies or indicates a priori which data is to be collected. That is, a configuration of the device 300 excludes any indication of identities of the measurement and control data and various other types of data that is to be collected at the device 300 for historization, e.g., in the embedded big data appliance 312 of the device 300. In currently known process plants or process control systems, an operator or a user typically must configure a process control device (e.g., a controller) to capture measurement and control data by identifying which data is to be collected or saved, and, in some embodiments, by specifying the times or frequencies at which said data is to be collected or saved. The identities (and, optionally, the times/frequencies) of the data to be collected are included in the configuration of the process control device. By contrast, the device 300 need not be configured with the identities of the measurement and control data that is desired to be collected and the times/frequencies of its collection. Indeed, in an embodiment, all measurement and control data as well as all other types of data that is directly generated by and/or directly received at the device 300 is automatically collected.

Further, the rate at which measurement and control data and various other types of data, is collected at and/or transmitted from the distributed big data device 300 also need not be configured into the device 300. That is, the rate at which data is collected and/or transmitted is excluded from a configuration of the device 300. Instead, the device 300 may automatically collect measurement and control data and various other types of data for local historization, in an embodiment.

Turning now to the embedded big data appliance 312 of the distributed big data device 300, the embedded big data appliance 312 may be, for example, the embedded big data appliance 116. As such, the embedded big data appliance 312 of FIG. 3 includes an embedded big data storage 314, an embedded big data receiver 316, an embedded big data analyzer 318, and a set of embedded big data request servicers or services 320a-320c. While FIG. 3 illustrates one embedded big data receiver 316, one embedded big data analyzer 318 and three embedded big data request servicers 320a-320c, the techniques and concepts discussed herein with respect to FIG. 3 may be applied to any number and any types of embedded big data receivers 316, big data analyzers 318, and/or big data request servicers 320. Further, in some embodiments, at least a portion of the embedded big data appliance 312 is integrated with the processor 308. For example, the processor 308 may be a smart chip that combines signal processing and learning, and may include one or more processing elements along with any or all of the components 314, 316, 318 and 320. Still further, in some embodiments, at least a portion of the embedded big data appliance 312 is integrated with the memory 310. For example, the memory 310 and at least a portion of the data storage 314 may be an integral, physical unit.

Generally, the embedded big data receiver 316 receives data collected by the distributed big data device 300 and stores the data in the embedded big data storage 314. Typically, but not necessarily, data that is received via the embedded big data receiver 316 is stored in the embedded big data storage 314, e.g., using a desired schema. The processor 308 may access the embedded big data receiver 316 via instructions stored in the memory 310 while the device 300 is in operation or on-line. The data collected by the distributed big data device 300 may be, for example, data that is transmitted or received via the big data network backbone 105 (e.g., streamed data), and/or may be data that is transmitted or received via other wired and/or wireless process control networks. In some cases, the data that is collected by the distributed by the distributed big data device 300 is generated or created by the device 300 itself.

The embedded big data storage 314 is a unitary, logical data storage area that locally stores and historizes, at the distributed big data device 300, all data including time-series data 314a and metadata 314b. In FIG. 3, the time-series data 314a is illustrated as being stored separately from the corresponding metadata 314b, although in some embodiments, at least some of the metadata 314b may be integrally stored with the time-series data 314a. In an embodiment, the embedded big data storage 314 stores one or more data entries. As such, each data entry includes a value of a datum or data point collected or captured by the device 300, and a respective timestamp or indication of an instance of time at which the data value was generated by, created by, received at, or observed by the device 300.

The embedded big data storage 314 may also store device configuration data, batch recipes, and/or other data that the distributed big data device 300 uses to resume operations after exiting an off-line state. For example, when a configuration of a device 300 is downloaded or changed, or when a new or changed batch recipe is downloaded, a snapshot of the corresponding data is received via the embedded big data receiver 316 and stored in the embedded big data storage 314. This snapshot may be used during re-boots, restoration, or at any other time when the device 300 moves from an off-line state into an on-line state. As such, communication burst loadings or spikes associated with the transfer of downloaded data from a workstation to the device 300 after changes in state of the device 300 may be decreased or eliminated. For example, delays in batch processing that occur as a result of the lengthy time required to transfer the recipe information to a controller may be decreased or eliminated. In addition, information in the snapshot may be used to trace changes in device configuration and to support a full restoration of configuration parameters and/or batch recipes in the device 300 after a power failure or another event that may cause the device 300 to be off-line.

In an embodiment, all data that is generated by, created by, received at, or otherwise observed by the distributed big data device 300 is caused to be stored in the embedded big data storage 314 via the embedded big data receiver 316. For example, at least a portion of all observed data is continually stored in the embedded big data storage 314.

The embedded big data analyzer 318 performs a local computation or data analysis, at the distributed big data device 300, on at least some of the data stored in the embedded big data storage 314 to determine meaningful patterns, correlations, trends, etc., and, in general, to generate new knowledge. The local computation or data analysis may be, for example, a learned data analysis routine, function or algorithm that was previously generated or created by the distributed big data device 300 itself. In some cases, the computation or data analysis was generated or created by another device, such as by another distributed big data device or by a centralized big data appliance, and the computation or data analysis has been received by and stored at the distributed big data device 300.

As a result of the performed computation or analysis, the embedded big data analyzer 318 may produce learned knowledge such as a new set of data points or observations, descriptive statistics related to the data, correlations in the data, new or modified models for the data, etc. The generated learned knowledge may provide a posteriori analysis of aspects of the device 300 (e.g., diagnostics or trouble shooting), and/or may provide a priori predictions (e.g., prognostics) corresponding to the device 300. In an embodiment, the embedded big data analyzer 318 performs data mining on a selected subset of the data stored in the embedded big data storage 314, and performs pattern evaluation on the mined data to generate the learned knowledge.

In some embodiments, multiple embedded big data analyzers 318 or instances thereof may cooperate to generate the learned knowledge.

The resulting learned knowledge may be stored in (e.g., added to) the embedded big data storage 314, for example, and may additionally or alternatively be presented at one or more user interface devices, such as at a distributed big data user interface 112 or legacy user interface. In some cases, the resulting learned knowledge includes additional data that was previously unknown to the device 300. For example, the additional data may include newly identified clusters of data, newly discovered hidden structures within the stored data, previously unknown relationships between stored data sets, etc. In some cases, the resulting learned knowledge includes a new or modified application, a new or modified function, a new or modified routine, a new or modified service, etc. For example, the resulting learned knowledge may be a newly created inferred function, which can be used for mapping new data examples.

In an embodiment, based on the resulting learned knowledge, the distributed big data device 300 may modify its operation to control a process in real-time in the process control system 10. For example, the distributed big data device 300 modifies its process model based on the resulting learned knowledge. In another example, the distributed big data device 300 updates its self-diagnostic routine based on the resulting learned knowledge. The distributed big data device 300 may also store an indication of the modification (e.g., an updated process model or self-diagnostic routine) in the embedded big data storage 314 in conjunction with the resulting learned knowledge. Additionally or alternatively, the distributed big data device 300 may cause the indication of the modification along with the resulting learned knowledge to be transmitted to another distributed big data device and/or to the centralized big data appliance 108 in the process control system 10. Moreover, the distributed big data device 300 may store analysis functions, routines, logic and/or algorithms in the form of analytics code (e.g., R scripts, Python scripts, Matlab® scripts, etc.), which may or may not be based on the resulting learned knowledge. The distributed big data device 300 may cause the stored logic and/or algorithms to be transmitted or downloaded to another distributed big data device. The another distributed big data device may then locally execute an operation using the downloaded logic and/or algorithms. Additionally or alternatively, the distributed big data device 300 may cause the stored logic and/or algorithms to be transmitted to the centralized big data appliance 108 in the process control system 10. The processor 308 may execute the embedded big data analyzer 318 via instructions stored in the memory 310. In an embodiment, the processor 308 may automatically execute the embedded big data analyzer 318 whenever data is collected and stored in the embedded big data storage 314.

The set of embedded big data request servicers or services 320a-320c are each configured to access the time-series data 314a and/or metadata 314b per the request of a requesting entity or application, which may execute on the device 300 or on another device communicatively connected to the device 300. For example, a requesting entity may be a data request application that is being executed by the processor 308 to request access to data stored in the embedded big data storage 314. The data request application may be stored as routines in the memory 310 of the device 300, for example. Based on a request of the data request application, the corresponding data may be retrieved from the embedded big data storage 314, and may be transformed and/or consolidated into data forms that are usable by the data request application. In an embodiment, one or more embedded big data request servicers 320 may perform data retrieval and/or data transformation on at least some of the requested data. Moreover, as previously discussed, at least some of the embedded big data request servicers 320a-320c may be an embedded data analyzer 124. For example, one of the embedded big data request servicers 320a-320b may perform a cross-correlation analysis, and another one of the embedded big data request servicers 320a-320b may perform a regression analysis.

In an embodiment, at least some of the embedded big data request servicers 320 may each provide a particular service or application that requires access to at least some of the data stored in the embedded big data storage 314. For example, the embedded big data request servicer 320a may be a configuration application service, the embedded big data request servicer 320b may be a diagnostic application service, and the embedded big data request servicer 320c may be an advanced control application service. The advanced control application service 320c may include, for example, model predictive control, batch and continuous data analytics, or other applications that require historized data for model building and other purposes. Other embedded big data request servicers 320 may also be included in the embedded big data appliance 312 to support other services or applications, e.g., a communication service, an administration service, an equipment management service, a planning service, and other services.

In an embodiment, at least some of the embedded big data request servicers 320 may support a streaming service. For example, one of the embedded big data request servicers 320 may cause at least a portion of the data stored in the embedded big data storage 314 to be streamed to other distributed big data devices, to the centralized big data appliance 108 in the process control system 10, and/or to the access application. In an embodiment, the other distributed big data devices, the centralized big data appliance 108 or the access application is a subscriber to a streaming service that delivers the stored data from the distributed big data device 300. For example, the device 300 is a host of the streaming service.

In an embodiment, at least some of the embedded big data request servicers 320 may be services (e.g., web services or other services) that are hosted at the distributed big data device 300 by the big data appliance 312 and that are accessible by other nodes of the big data network 100 (e.g., user interface devices 112 or provider devices 110). Accordingly, at least some of the distributed big data devices or nodes 102 may include a respective web server to support a web browser, web client interface, or plug-in corresponding to an embedded big data request servicer 320, in an embodiment. For example, a browser or application hosted at a user interface device 112 may source data or a web page stored at the embedded big data appliance 312.

The distributed big data device 300 in process control plants and systems causes data and/or learned knowledge that is locally observed by the device 300 to be historized in the local embedded big data storage 314. In some cases, local historized data 314 may transmitted, using the network interface 302, to the process control system big data appliance 108 in the process plant or system 10 or to another centralized or distributed big data node. In an embodiment, a schema utilized by the embedded big data storage 314 for historized, data storage at the device 300 is included in a schema utilized by a centralized process control system big data appliance 108. In another embodiment, the data historized in the embedded big data storage 314 is stored according to a local schema of the device 300.

In some embodiments, devices 300 that support distributed big data in process control systems may be utilized for layered or leveled learning of big data in a process control network or system 10. In an example scenario, a distributed big data device 300 transmits its stored data and/or learned knowledge to one or more other intermediate distributed big data devices or nodes so that the one or more other intermediate distributed big data devices or nodes may use the received data and/or learned knowledge in its own local analytics.

Figure 4:
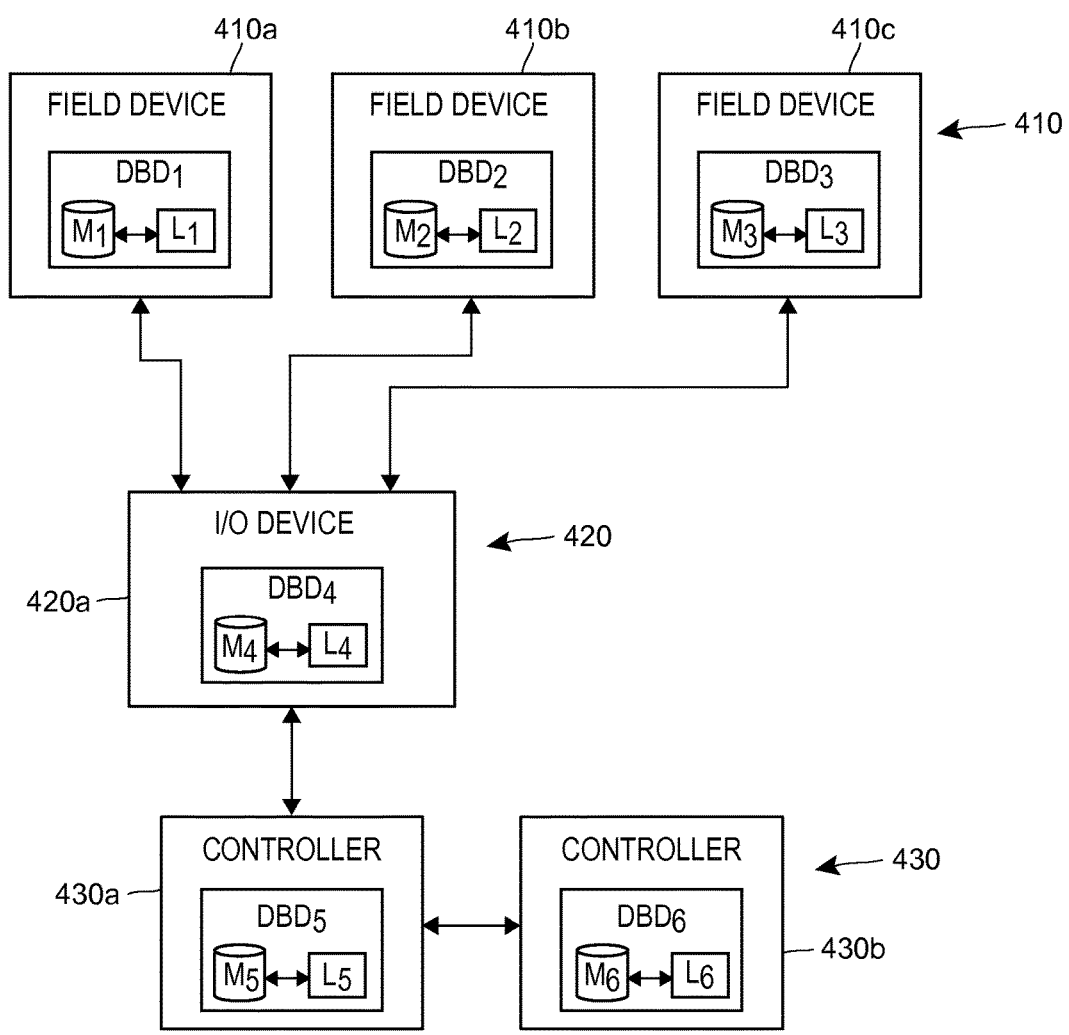
FIG. 4 is a block diagram illustrating an example use of distributed big data devices that support leveled or layered learning.

To illustrate, FIG. 4 is an example block diagram that illustrates more detailed example concepts and techniques for leveled or layered learning of big data using distributed big data devices in a process control system. Embodiments of the techniques illustrated by FIG. 4 may be utilized, for example, by the distributed big data device 300 of FIG. 3 or by other suitable devices, and/or in the process control system big data network 100 of FIG. 1 or in other suitable networks. For ease of discussion, though, FIG. 4 is discussed with reference to elements in FIGS. 1-3.

FIG. 4 shows an example use of multiple distributed big data devices in process control systems (e.g., multiple instances of the distributed big data device 300 of FIG. 3). In particular, FIG. 4 illustrates an example use of such distributed big data devices for leveled or layered storage and learning based on big data. FIG. 4 shows three example levels 410-430, with the level 410 as having three distributed big data process control devices 410a-410c, the level 420 as having one distributed big data process control device 420a, and the level 430 as having two distributed big data process control devices 430a and 430b.

As shown in FIG. 4, each of the distributed big data process control devices 410a-410c, 420a, 430a and 430b is an instance of the device 300 illustrated in FIG. 3, and cooperates with other process control devices to control one or more processes in a process control system or plant. For example, at the level 410, the distributed big data process control devices 410a-410c are depicted in FIG. 4 as field devices, each of which is configured to perform a physical function to control a process or a process controlled in the process plant 10. The field devices 410a-410c receive and/or generate process control data corresponding to controlling the process in real-time, for example. At the level 420, the distributed big data process control device 420a is depicted as an I/O device configured to receive the process control data generated by the field devices 410a-410c and forward the process control data to a controller 430a, and to forward process control data from a controller 430a to a field device 410a-410c.

At the level 430, the distributed big data process control devices 430a and 430b are depicted as process controllers, each of which is configured with a respective control algorithm to input process control data and execute one or more control functions to generate an output (not shown) to control the process. As shown in FIG. 4, the process controller 430a is configured to receive process control data from the I/O device 420a and to send process control data to the I/O device 420a, as well as communicate process data to/from the process controller 430b. In some embodiments, the I/O device 420a and the controllers 430a, 430b may each send or receive additional process control data to or from other devices or nodes not shown in FIG. 4.

The example configuration of the distributed big data process control devices 410a-410c, 420a, 430a and 430b supports layered or leveled big data storage and learning in the process control system or plant 10. In FIG. 4, each of the distributed big data process control devices 410a-410c, 420a, 430a and 430b is labeled "DBDx," which corresponds to a respective embedded big data appliance (e.g., the embedded big data appliance 312 of FIG. 3) included in the respective device 410a-410c, 420a, 430a and 430b. Each of the respective embedded big data appliances DBDx includes an embedded big data storage $M_X$, which may correspond to the embedded big data storage 314 of FIG. 3, and an embedded big data analyzer $L_X$, which may correspond to the embedded big data analyzer 318 of FIG. 3. Accordingly, in FIG. 4, the distributed big data process control devices 410a-410c, 420a, 430a and 430b each respectively collect and store respective data in the respective embedded big data storages $M_1$-$M_6$, for example, in a manner such as previously described above.

For example, each device 410a-410c, 420a, 430a and 430b respectively collects local data at a rate at which the local data is generated, created, received, or otherwise observed, and stores the collected local data in the respective embedded big data storages $M_1$-$M_6$, e.g., as local, historized big data. This distributed, localized big data collection and analytics allows for more timely feedback on potentially detrimental situations occurring within the process plant 10. For example, in an illustrative scenario, the controller 430a controls a collection of process control devices (e.g., field devices 410a-410c and optionally other devices) as part of a control loop included in a process plant that produces a particular product. A certain combination of events in the control loop leads to poor product quality when the product is eventually generated at a later time (e.g., several hours after the occurrence of the combination of events). Rather than detecting and determining the poor product quality several hours hence and trouble-shooting to determine the root causes of the poor product quality (as is currently done in known process control systems), the controller 430a utilizes its embedded big data analyzer $L_5$ to automatically analyze the process data generated by the combination of events at or shortly after their occurrence (e.g., when the data corresponding to the events' occurrences is transmitted to the embedded big data storage $M_5$). The embedded big data analyzer $L_5$ may generate learned knowledge that predicts the poor product quality based on the occurrence of these events, and/or may automatically adjust or change one or more parameters or processes in real-time to mitigate the effects of the combination of events if and when they occur in the future. For instance, the embedded big data analyzer $L_5$ may determine a revised setpoint or revised parameter values and cause the revised values to be used by controller 430a to better regulate and manage the control loop.

Thus, each device 410a-410c, 420a, 430a and 430b uses its respective embedded big data analyzer $L_1$-$L_6$ to analyze data stored in its respective embedded big data storage $M_1$-$M_6$ to determine meaningful patterns, correlations, trends, etc., (e.g., data generated by the each device 410a-410c, 420a, 430a and 430b as a result of its analysis of its local big data). The learned patterns, correlations, trends, etc. is stored in the device's respective embedded big data storage $M_1$-$M_6$, e.g., as learned data. Further, each device 410a-410c, 420a, 430a and 430b may locally determine or define a new service, function, routine, or application (and/or modify an existing service, function, routine, or application) based on the data generated from its analysis of its local big data, e.g., learned services, functions or applications. The respective knowledge data and/or knowledge services, functions, and/or applications that are locally learned at each device 410a-410c, 420a, 430a and 430b is added to or stored in its respective embedded big data storages $M_1$-$M_6$ for subsequent use by the respective device and/or by other devices in layered or leveled learning. As used herein, the term "learned knowledge" generally refers to data, services, functions, routines, and/or applications that are generated as a result of analyzing big data. Still further, each distributed big data device 410a-410c, 420a, 430a and 430b may share its locally learned knowledge with other distributed big devices at the same or different levels.

For example, with reference to FIG. 4, each of the field devices 410a-410c at the level 410 collects local data to be stored in its respective embedded big data storage $M_1$-$M_3$, and use its respective embedded big data analyzers $L_1$-$L_3$ to analyze portions or all of the collected data in order to generate locally learned knowledge. In an illustrative example, the field device 410a is a flame sensor for a boiler that collects flame data on the boiler flame, and stores the collected data with corresponding time stamps within its embedded big data storage $M_1$. Once collected, the embedded big data analyzer $L_1$ executes one or more algorithms to analyze the flame data to recognize flame patterns that occur over time. The embedded big data analyzer $L_1$ saves the learned flame patterns in the embedded big data storage $M_1$, as knowledge data learned from the local analysis of the big data stored in $M_1$, e.g., additional learned big data.

In this illustrative example, the field device 410a causes at least some of the learned knowledge stored in its embedded big data storage $M_1$ to be delivered to the I/O device 420a, such as via the process control system big data network 105 or via another communications network. As shown in FIG. 4, the I/O device 420a is an example of an intermediate device or node that is disposed, in the communication path of the network 105, between the field devices 410a-410c and the controller 430a, e.g., the I/O device 420a is disposed upstream of the field devices 410a-410c, and is disposed downstream of the controller 430a.

At the level 420, the I/O device 420a stores, in its respective embedded big data storage $M_4$, any learned knowledge generated at and received from the field devices 410a (and, in some embodiments, learned knowledge generated at and received from other the field devices 410b, 410c and/or other devices), along with other data that the I/O device 420a directly (e.g., locally) generates and receives. The I/O device 420a may also use its respective embedded big data analyzer $L_4$ to perform analysis or learning on the other data in conjunction with the learned knowledge received from the field device 410a. For example, continuing with the above flame sensor example, the I/O device 420a receives the learned flame patterns from the device 410a and uses them as a model to analyze other flame data received from other flame sensors connected to the I/O device 420a. In another example, the I/O device 420a accumulates learned knowledge related to alarm data trends from a particular batch of process control devices (not shown in FIG. 4) across time. The I/O device 420a may utilize the embedded big data analyzer $L_4$ to execute algorithms (e.g., PCA) to determine if there are causal relationships between the learned flame patterns and the alarm data trends over time. Generally, the I/O device 420a stores all locally-generated learned knowledge and all received, remotely-generated learned knowledge in its embedded big data storage $M_4$.

At the level 430, the controller 430a stores learned knowledge received from other distributed big data devices (e.g., the I/O device 420a, the downstream field devices 410a-410c, the controller 430b) in its embedded big data storage $M_5$ along with data and learned knowledge that the controller 430a itself directly generates and receives. The controller 430a may perform further analysis or learning on at least some of its stored data to generate additional learned knowledge (e.g., data patterns, trends, correlations, etc., services, functions, routines, and/or applications). The additional learned knowledge generated by the controller 430a is stored in its embedded big data storage $M_5$.

In an embodiment, layered or leveled learning is carried out on a bottom-up or downstream-to-upstream basis. In an illustrative example, a field device 410a analyzes its collected data to determine if it is operating correctly, e.g., to determine if the field device 410a is properly calibrated so as to collect the correct data. Knowledge that the field device 410a learns from its analysis may result in the field device 410a generating a new diagnostic routine (e.g., a learned routine) that the field device 410a can use for future diagnostic purposes. The generated diagnostic routine may be stored in the respective embedded big data storage of the field device 410a, e.g., $M_1$. The field device 410a may transmit the generated diagnostic routine to an upstream controller 430a. For example, the field device 410a may independently initiate the sharing of the new diagnostic routine with the upstream controller 430a (e.g., automatically as generated or on a periodic basis), or the field device 410a may cause the new diagnostic routine to be transmitted when the controller 430a requests the field device 410a to share one or more types of new learned knowledge.

In an embodiment, layered or leveled learning is carried out on a top-down or upstream-to-downstream basis. To illustrate, and continuing with the above example, the controller 430a may analyze the received diagnostic routine (e.g. by using its analyzer $L_5$) and determine that the diagnostic routine is useful or applicable to other field devices (e.g., the field devices 410b and 410c) that are being controlled by the controller. Accordingly, the controller 430a may distribute the diagnostic routine to the other field devices 410b, 410c so that the field devices 410b, 410c are able to utilize the diagnostic routine for their respective diagnostic purposes. The controller 430a may independently initiate the sharing of the new diagnostic routine with the downstream field devices 410b, 410c, or the controller 430a may cause the new diagnostic routine to be transmitted upon request of the field device 410a. Alternatively or additionally, the controller 430a may generate a general diagnostic routine by aggregating and analyzing learned knowledge received from all field devices connected to the controller. In this scenario, the controller 430a distributes the general diagnostic routine to any or all of the field devices connected to the controller, e.g., automatically as generated or on a periodic basis, upon request of a particular field device, when the controller 430a receives data from a field device that indicates that the general diagnostic may be of use to the device, or for some other reason.

In an embodiment, layered or leveled learning is carried out between distributed big data devices at the same level. To illustrate, and continuing with the above example, the controller 430a transmits the general diagnostic routine to the controller 430b so that the controller 430b may utilize and/or distribute the general diagnostic routine to devices controlled by the controller 430b. Similarly, the controller 430a may receive another diagnostic routine from the controller 430b, and may distribute the further diagnostic routine to the field devices 410a-410c whenever a diagnostic service is needed by the field devices 410a-410c. Of course, other types of learned knowledge may be shared across devices at the same level, e.g., automatically, upon request, based on the transmitting device perceiving or detecting a need of a recipient device for the learned knowledge, and/or based on other triggers.

In some embodiments, one or more of the devices 410a-410c, 420a, 430a and 430b causes some or all of its local big data stored at their respective embedded big data storages $M_1$-$M_6$ (e.g., including locally generated/received data, locally-generated learned knowledge, and received, remotely-generated learned knowledge) to be delivered and/or streamed to the centralized process control system big data storage area 130. For example, one or more of the devices 410a-410c, 420a, 430a and 430b transmits at least some of its respective stored big data to one or more centralized process control system big data receivers 132 (e.g., by using the network backbone 105). In some embodiments, one or more of the devices 410a-410c, 420a, 430a and 430b pushes at least some of its local big data to the centralized process control system big data storage area 130 at periodic intervals. In some embodiments, one or more of the devices 410a-410c, 420a, 430a and 430b provides at least a portion of its local big data in response to a request (e.g., from the centralized process control system big data appliance 108).

Once received and stored at the centralized process control system big data storage area 130, one or more centralized process control system big data analyzers 134 may operate on the received learned knowledge to generate additional knowledge and determine relationships between various entities and providers internal and external to the process plant 10. In some cases, the centralized process control system big data appliance 108 utilizes the knowledge and relationships generated by the centralized process control system big data analyzers 134 to control one or more processes of the plant 10 accordingly. In an example scenario, at least some of the centralized process control system data analyzers 134 monitor and detect potential security issues associated with the process plant 10, such as increases in log-in patterns, retries, and their respective locations. In another example scenario, the centralized process control big data analyzers 134 analyzes data aggregated across the process plant 10 and one or more other process plants. In this manner, the centralized process control system big data appliance 108 may allow a company that owns or operates multiple process plants to glean and share learned diagnostic and/or prognostic information on a region, an industry, or a company-wide basis.

Thus, the big data appliance 108 may be considered a highest level distributed data device at which learned knowledge may be generated within the process plant 10. Of course, in some process plants, the big data appliance 108 may simultaneously serve as another distributed big data device as well as a centralized big data device. For example, referring to FIG. 2, the big data appliance 108 is one of many distributed big data devices 15, 18-20, 26, 42a, 42b, 58, as well as serves as a centralized big data appliance 108 for centralized big data devices 16, 21, 28, 44.

In FIG. 4, only three levels or layers of distributed big data storage and learning are depicted. However, the techniques and concepts discussed with respect to FIG. 4 may be applied to any number of levels of distributed big data storage and learning, with each level having any number of distributed big data process control devices. Furthermore, distributed big data nodes 110 may communicate learned knowledge with each other by using the process control system big data network backbone 105, and/or by using another communications network and/or other protocol, such as HART, WirelessHART, Fieldbus, DeviceNet, WiFi, Ethernet, or other protocol.

Of course, while leveled or layered big data storage and learning has been discussed with respect to distributed big data provider devices or nodes 110, the concepts and techniques may apply equally to distributed big data user interface devices nodes 112 and/or to other types of distributed big data devices or nodes 114 in process control plants and systems. In an embodiment, a subset of the distributed big data devices or nodes 102 perform leveled or layered big data storage and learning without using an intermediate node.

Figure 5:
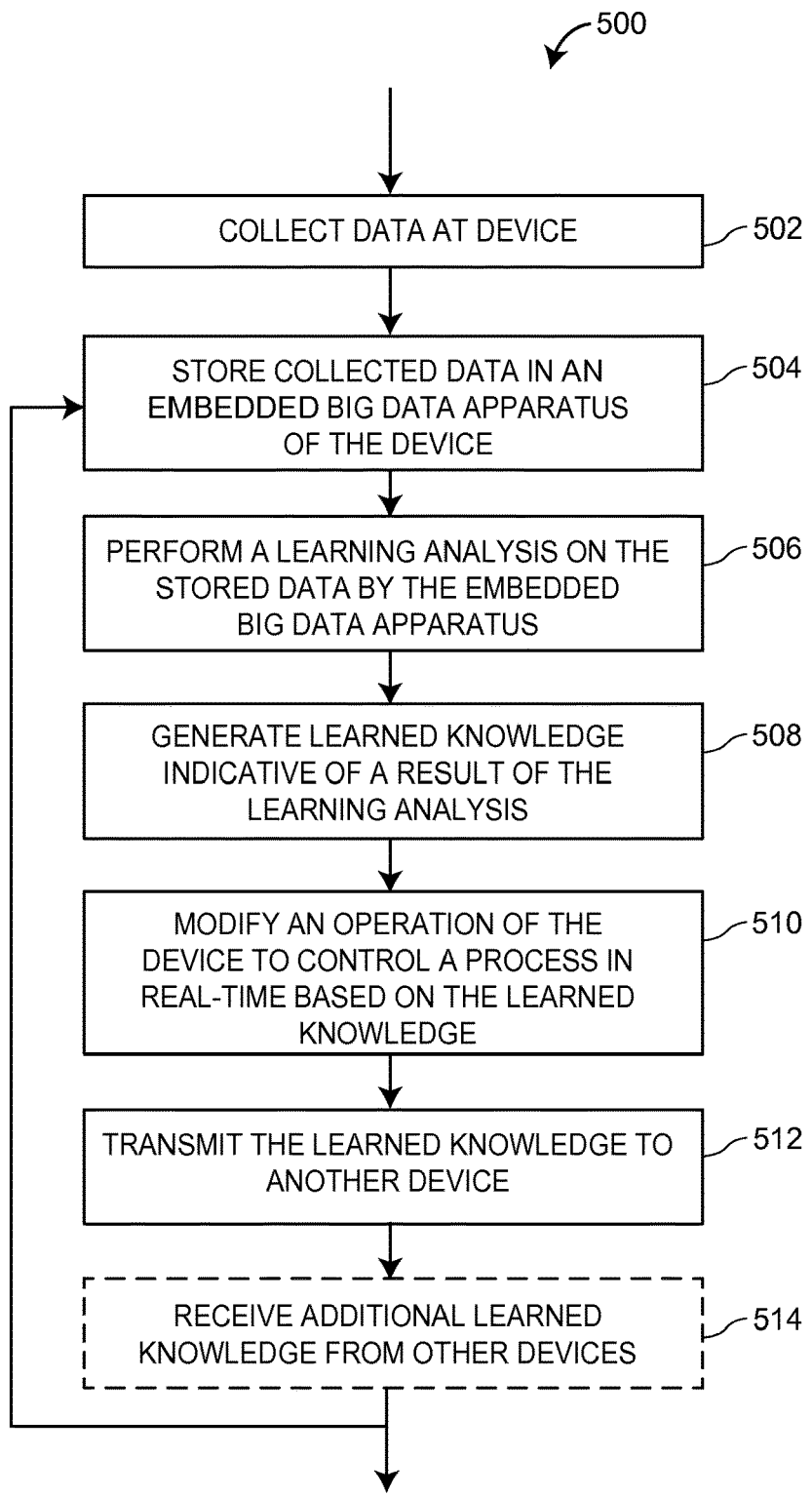
FIG. 5 is a flow diagram of an example method for using distributed big data devices in a process control system or process plant.

FIG. 5 illustrates a flow diagram of an example method 500 for using distributed big data devices in process plants and process control systems. The method 500 may be performed, for example, by the distributed big data device 300 of FIG. 3, in conjunction with the leveled or layered storage and learning techniques shown in FIG. 4, by one of the distributed big data provider nodes or devices 110 of FIG. 2, and/or in conjunction with the plurality of distributed big data devices or nodes 102 of the big data network 100 of FIG. 1. In an embodiment, the method 500 is implemented by a node of the big data network 100 of FIG. 1 that supports distributed big data. For ease of discussion, and not for limitation purposes, the method 500 is described with simultaneous reference to FIGS. 1-4.

At a block 502, data corresponding to process control plants or networks may be collected. For example, data that is generated in real-time from the real-time operation and control of a process executing in a process plant is collected by a distributed big data device DBD. The distributed big data device may be communicatively coupled to a communications network of a process plant or process control system, such as via the network backbone 105 of the process control system big data network 100. The distributed big data device may be a process control device that operates to control a process in real-time in the process plant such as a field device, a process controller, an I/O device; a gateway device; an access point; a routing device; a network management device; a user interface device; a historian device; or some other distributed big data device associated with the process plant or with the process in the process plant (e.g., any of the devices DBD shown in FIG. 2, or other distributed big data devices). The data collected at the distributed big data device may include measurement data, event data, batch data, calculated data, configuration data and/or continuous data. Generally, the collected data typically includes all types of data that are generated by, created by, received at, or otherwise observed by the device. For example, the distributed big data device collects data at respective rates at which the data is observed, and/or the distributed big data device collects all data that is observed by the device. The data may be collected without an identification of the data being included a priori in a configuration of the device. Further, the data may be collected at the device at a rate of generation by the device, a rate of creation by the device, or at a rate of reception at the device, again without requiring the rate to be included a priori in the configuration of the device.

In an embodiment, the data collected at the distributed big data device may include streamed data from other distributed big data devices or that is observed by the distributed big data device itself. In some embodiments, the distributed big data device may cause at least a portion of the collected data to be transmitted or streamed at the block 502. For example, the collected data is immediately streamed from the distributed big data device to be historized at the centralized big data appliance 108.

At a block 504, the collected data may be stored in an embedded big data apparatus at the distributed big data device, such as the embedded big data apparatus 116. For example, the data and its respective timestamp are stored as an entry in an embedded big data storage of the embedded big data apparatus. In embodiments where multiple values of the data are obtained over time (block 502), each value is stored, along with its respective timestamp, in the same entry or in a different entry of the embedded big data storage.

At a block 506, one or more learning analyses are performed on at least a portion of the stored data, e.g., to learn, predict, or discover new knowledge, meaningful relationships, patterns, correlations, trends, etc. The one or more learning analyses (e.g., as performed by one or more of the embedded data analyzers 124) may include any number of data discovery and/or learning algorithms and techniques such as previously discussed, e.g., a partial least square analysis, a random forest, a pattern recognition, a predictive analysis, a correlation analysis, a principle component analysis, a machine learning analysis, data mining, data discovery, or other techniques. In an example, the embedded big data appliance 116 analyzes at least some of the stored data to extract data patterns, which are then evaluated to discover patterns of interest that represent knowledge based on interestingness measures. In some cases, the embedded big data appliance 116 determines which learning analysis or analyses to use, and determines what portions (or in some cases, all) of the stored data on which the learning analysis or analyses is to operate. For example, the determination of the learning analysis includes a selection or a derivation of the learning analysis. As such, the selection or derivation of the learning analysis may be based on one or more properties of at least a portion of the stored data, e.g., based on the respective timestamp associated with the stored data, based on offsets or other measures present in the stored data, based on the type of field devices that the stored data originated from, based on certain identified clusters within the stored data, etc.

At a block 508, learned knowledge that is indicative of a result of the learning analysis is created or generated, e.g., by the embedded big data appliance 116. For example, created or generated learned knowledge includes learned data and/or one or more learned applications, functions, routines, services, or modifications thereto. The learned knowledge may provide new information (e.g., to the device performing the method 500, to other distributed big data devices, and/or to the centralized process control system big data appliance 108) that is useful for any number of prediction, modeling, diagnostics, and/or trouble shooting purposes. Typically, but not necessarily, the learned knowledge is locally stored in or added to the embedded big data storage 120 of the embedded big data apparatus 116.

At a block 510, based on the learned knowledge (block 505), the method 500 includes modifying an operation of a distributed big data device that controls, in real-time, at least a portion of the process in the process plant. For example, learned knowledge could result in a creation of a new diagnostic that is subsequently performed by the device, or a creation of a new process model which is implemented in the device. Additionally or alternatively, the method includes causing at least some of the learned knowledge to be transmitted to another distributed big data device DBD and/or to the centralized big data appliance 108, e.g., for the recipient distributed big data device to utilize in its respective learning analyses. In some embodiments, only one of the blocks 510 or 512 is included in the method 500. In other embodiments, the blocks 510 and 512 are executed in sequence so that the distributed big data device first modifies its operation based on the learned knowledge (block 510) and then transmits that learned knowledge to other big data devices (block 512), or vice versa. In still other embodiments of the method 500, the blocks 510 and 512 are executed in parallel.

The method 500 optionally includes receiving additional learned knowledge (block 514) from other distributed big data devices DBD in the process plant, and/or from the centralized big data appliance 108. The distributed big data device may store (block 504) the received learned knowledge (e.g., in its embedded storage 120), and may perform one or more subsequent learning analyses (block 506) on the additional learned knowledge and at least a portion of the stored data. Based on the outputs of the subsequent learning analysis or analyses, additional learned knowledge may be created, generated (block 508), and optionally stored at the distributed big data device. In some situations, based on the newly generated learned knowledge, one or more operations of the distributed data device are modified (block 510), and/or at least some of the new learned knowledge is transmitted to one or more other big data devices (block 512) or applications.

Embodiments of the techniques described in the present disclosure may include any number of the following aspects, either alone or combination:

1. A process control device for supporting distributed big data in a process plant, the process control device including a processor and one or more tangible, non-transitory, computer-readable storage media having stored thereon a set of computer-executable instructions that, when executed by the processor, cause the process control device to operate to control, in real-time, at least a portion of a process executed by the process plant by at least one of: generating process data used to control the at least the portion of the process, or operating on received process data to control the at least the portion of the process. As such, the generated process data and the received process data may be process data that is generated from real-time control of the process. The process control device further includes an indication of a type of the process control device, where the type corresponds to one of a field device, a controller, or an input/output (I/O) device disposed between and connected to the field device and the controller. Still further, the process control device includes an embedded big data apparatus that is configured to store the generated process data and the received process data; perform a learning analysis on at least a part of the stored process data; create learned knowledge based on a result of the learning analysis; and cause the learned knowledge to be transmitted to another process control device in the process plant.

2. The process control device of the previous aspect, wherein the stored process data includes multiple types of data, and wherein a set of types of the stored process data includes continuous data, event data, measurement data, batch data, calculated data, and configuration data corresponding to controlling the process executed by the process plant.

3. The process control device of any one of the previous aspects, wherein the embedded big data apparatus is further configured to determine the learning analysis based on the stored process data, and wherein the determination of the learning analysis is at least one of a selection or a derivation of the learning analysis.

4. The process control device of any one of the previous aspects, wherein the learning analysis includes at least one of a partial least square regression analysis, a random forest, a pattern recognition, a predictive analysis, a correlation analysis, a principle component analysis, data mining, or data discovery.

5. The process control device of any one of the previous aspects, wherein the embedded big data apparatus is further configured to receive another data analysis algorithm from another big data device and to execute the another data analysis algorithm.

6. The process control device of any one of the previous aspects, wherein at least one of: the another big data device is one of another distributed data device or a centralized big data device of the process plant; or the another data analysis includes at least one of an R script, a Python script, or a Matlab script.

7. The process control device of any one of the previous aspects, wherein the process control device is further configured to modify, based on the learned knowledge, an operation of the process control device to control, in real-time, the process executed by the process plant, and to cause an indication of the modification to be transmitted to the another process control device in conjunction with the learned knowledge.

8. The process control device of any one of the previous aspects, wherein the modification is an updated process model.

9. The process control device of any one of the previous aspects, further comprising one or more interfaces connecting the process control device to at least one of a wired communications network or a wireless communications network.

10. The process control device of any one of the previous aspects, wherein the one or more interfaces include: a first interface coupled to a first communication network via which the learned knowledge is transmitted to the another process control device, and a second interface coupled to a second communications network different from the first communications network, the second interface used by the process control device to at least one of transmit the generated process data or receive the received process data.

11. The process control device of any one of the previous aspects, wherein the learned knowledge is first learned knowledge, the learning analysis is a first learning analysis, and the another process control device is a first other process control device; and wherein the embedded big data apparatus is further configured to: receive second learned knowledge created by the first other process control device or created by a second other process control device, and at least one of (i) modify, based on the received second learned knowledge, an operation of the process control device to control, in real-time, the process, or (2) perform a second learning analysis on at least some of the stored process data and the received second learned knowledge.

12. The process control device of any one of the previous aspects, wherein the learned knowledge includes at least one of additional data that was previously unknown to the process control device, an application, a service, a routine, or a function.

13. A method of supporting distributed big data using a device of zero or more of the previous aspects, the device being communicatively coupled to a communications network of a process plant, and the device operating to control a process in real-time in the process plant. The method includes collecting data at the device, where the collected data includes at least one of: (i) data that is generated by the device, (ii) data that is created by the device, or (iii) data that is received at the device. The collected data generally is a result of the control of the process in real-time, and a type of the device is included in a set of device types that includes a field device, a controller, and an input/output (I/O) device. The method also includes storing, in an embedded big data apparatus of the device, the collected data; and performing, by the embedded big data apparatus of the device, a learning analysis on at least a portion of the stored data. Further, the method includes generating learned knowledge indicative of a result of the learning analysis; and modifying, based on the learned knowledge, an operation of the device to control the process in real-time.

14. The method of any one of the previous aspects, wherein collecting the data at the device comprises at least one of: collecting all data that is generated by the device, collecting all data that is created by the device, or collecting all data that is received at the device.

15. The method of any one of the previous aspects, wherein collecting the data at the device comprises at least one of: collecting data that is generated by the device at a rate of generation, collecting all data that is created by the device at a rate of creation, or collecting all data that is received at the device at a rate of reception.

16. The method of any one of the previous aspects, wherein collecting the data at the device comprises collecting, at the device, at least one type of data included in a set of types of data that includes continuous data, event data, measurement data, batch data, calculated data, and configuration data.

17. The method of any one of the previous aspects, wherein the device is a first device, the learned knowledge is first learned knowledge, and the operation of the device is a first operation; and the method further comprises receiving, at the first device, second learned knowledge generated by a second device; performing, by the embedded big data apparatus of the first device, a further learning analysis on the second learned knowledge and at least some of the stored data; generating, by the embedded big data apparatus of the first device, further learned knowledge indicative of a result of the further learning analysis; and modifying the first operation or a second operation of the device to control the process in real-time based on further learned knowledge.

18. The method of any one of the previous aspects, wherein receiving the second learned knowledge generated by the second device comprises receiving the second learned knowledge generated by another device that is one of: a field device, a controller, an I/O device, a user interface device, a gateway device, an access point, a routing device, a historian device, or a network management device.

19. The method of any one of the previous aspects, further comprising causing the learned knowledge to be transmitted to another device, wherein a device type of the another device is included in the set of device types.

20. The method of any one of the previous aspects, wherein generating the learned knowledge comprises generating at least one of: additional data that was previously unknown to the device, a new or modified application, a new or modified function, a new or modified routine, or a new or modified service.

21. The method of any one of the previous aspects, wherein performing the learning analysis comprises performing at least one of a machine learning analysis, a predictive analysis, data mining, or data discovery.

22. A system for supporting distributed big data in a process plant comprising: a communications network having a plurality of nodes, at least one of which is a process control device operating, in real-time, to control a process executing in the process plant, and each of the plurality of nodes is configured to: collect data generated in real-time resulting from control of the process executing in the process plant; locally store the collected data at a respective embedded big data apparatus included in the each of the plurality of nodes; and perform, using the respective embedded big data apparatus included in the each of the plurality of nodes, a respective learning analysis on at least a portion of the locally stored data. A first node included in the plurality of nodes is further configured to cause learned knowledge indicative of a result of a performance of the respective learning analysis to be transmitted to a second node included in the plurality of nodes for use in one or more learning analyses performed by the second node. The system may be configured to perform the method of any zero or more of the previous aspects, and may include a process control device according to any of the previous aspects.

23. The system of any one of the previous aspects, wherein: the process control device is a controller configured to receive a set of inputs and determine, based on the set of inputs, a value of an output. The controller is further configured to cause the output to be transmitted to a field device to control the process executed by the process plant, and the field device is configured to perform a physical function based on the output of the controller to control the process executed by the process plant.

24. The system of any one of the previous aspects, wherein the communications network is a first communications network, and wherein the controller is configured to at least one of: receive at least one input of the set of inputs at an interface to a second communications network, or cause the output to be transmitted to the field device via the interface to the second communications network.

25. The system of any one of the previous aspects, wherein the learned knowledge includes at least one of an application, a function, a service, or a routine.

26. The system of any one of the previous aspects, wherein the result of the performance of the respective learning analysis includes a prediction based on properties of the at least the portion of the locally stored data.

27. The system of any one of the previous aspects, wherein the result of the performance of the respective learning analysis includes additional data that was previously unknown to the first node.

28. The system of any one of the previous aspects, wherein the learned knowledge is first learned knowledge, and wherein the second node is configured to: receive the first learned knowledge from the first node; perform, by a respective embedded big data apparatus included in the second node, one or more learning analyses on the first learned knowledge and at least a portion of locally collected and stored data at the second node; generate second learned knowledge from the performed one or more learning analyses, and at least one of: store, at the respective embedded big data apparatus of the second node, the second learned knowledge; modify an operation of the second node to control the process based on the second learned knowledge; or cause the second learned knowledge to be transmitted to a third node of the plurality of nodes.

29. The system of any one of the previous aspects, wherein the third node is configured to: receive the second learned knowledge from the second node; perform, by a respective embedded big data apparatus of the third node, one or more learning analyses on the second learned knowledge and at least a portion of locally collected and stored data at the third node; generate third learned knowledge from the performed one or more learning analyses, and at least one of: store, at the respective embedded big data apparatus of the third node, the third learned knowledge; modify an operation of the third node to control the process based on the third learned knowledge; or cause the third learned knowledge to be transmitted to a fourth node of the plurality of nodes.

30. The system of any one of the previous aspects, wherein the plurality of nodes includes at least two devices from a set of devices including: a controller configured to receive a set of inputs, determine, based on the set of inputs, a value of an output, and cause the output to be transmitted to a first field device to control the process executed by the process plant; a field device being configured to perform a physical function based on the output of the controller to control the process; an input/output (I/O) device having a interface to the controller and an interface to at least one field device; a user interface device; a gateway device; an access point; a routing device; a historian device; and a network management device.

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed:

1. A first process control device for supporting distributed big data in a process plant, the first process control device being a field device that performs a physical function to control at least a pre-determined portion of a process in the process plant, and the field device including:
   (i) a device processor;
   (ii) one or more device tangible, non-transitory, computer-readable storage media having stored thereon a set of computer-executable instructions that, when executed by the device processor, cause the field device to at least one of:
      (i) perform the physical function, generate process data corresponding to the performed physical function, and transmit, via a communication network within the process plant, the generated process data to a second process control device operating to control the process in real-time, or
      (ii) receive process data from the second process control device via the communication network within the process plant, and perform the physical function based on the received process data;

(iii) a first interface via which the field device is connected to an input/output (I/O) device, the I/O device disposed between the field device and a controller and communicatively connecting the field device to the communication network, the generated process data transmitted via the first interface, and the received process data received via the first interface; and (iv) an embedded big data apparatus having embedded data storage and embedded computer-executable instructions stored on one or more embedded tangible, non-transitory, computer-readable storage media that, when executed by one or more processors, cause the embedded big data apparatus to:

locally store, in the embedded big data storage, the generated process data and the received process data;
perform a learning analysis on at least a part of the locally stored process data;
create learned knowledge based on a result of the learning analysis, the learned knowledge including at least one of a time relationship or a causal relationship between process variables having values included in the locally stored process data;
locally store the created learned knowledge in the embedded big data storage of the embedded big data apparatus included in the field device; and
cause at least a portion of the locally stored learned knowledge to be distributed, via a second interface included in the field device and communicatively connecting the field device with a process control big data network different than the communication network, to the second process control device in the process plant to thereby modify, based upon the distributed learned knowledge, an operation of the second process control device, the second process control device including a respective embedded big data apparatus and operating in real-time to control the process.

2. The first process control device of claim 1, wherein the locally stored process data includes multiple types of data, and a set of types of the locally stored process data includes continuous data, event data, measurement data, batch data, calculated data, and configuration data corresponding to controlling the process executed by the process plant.

3. The first process control device of claim 1, wherein the embedded computer-executable instructions of the embedded big data apparatus are further executable to cause the embedded big data apparatus to determine the learning analysis based on the locally stored process data, wherein the determination of the learning analysis is at least one of a selection or a derivation of the learning analysis.

4. The first process control device of claim 1, wherein the learning analysis includes at least one of a partial least square regression analysis, a random forest, a pattern recognition, a predictive analysis, a correlation analysis, a principle component analysis, data mining, or data discovery.

5. The first process control device of claim 1, wherein the learning analysis is a first data analysis algorithm, and the embedded computer-executable instructions of the embedded big data apparatus are further executable to cause the embedded big data apparatus to receive another data analysis algorithm from another big data device via the process control big data network and to execute the another data analysis algorithm.

6. The first process control device of claim 5, wherein at least one of:
the another big data device is one of another distributed data device or a centralized big data device of the process plant; or
the another data analysis algorithm includes at least one of an R script, a Python script, or a Matlab® script.

7. The first process control device of claim 1, wherein the first process control device is further configured to:
modify, based on the learned knowledge, an operation of the first process control device to control, in real-time, the process executed by the process plant, and
cause an indication of the modification to be transmitted to the second process control device or to a third process control device in conjunction with the learned knowledge.

8. The first process control device of claim 7, wherein the modification is an updated process model.

9. The first process control device of claim 1, wherein the communication network comprises at least one of a wired communications network or a wireless communications network.

10. The first process control device of claim 1, wherein the learned knowledge includes at least one of additional data that was previously unknown to the first process control device, an application, a service, a routine, or a function.

11. The first process control device of claim 1, wherein:
the learned knowledge is first learned knowledge and the learning analysis is a first learning analysis; and
the embedded computer-executable instructions of the embedded big data apparatus are further executable to cause the embedded big data apparatus to:
receive second learned knowledge created by the second process control device or by a third process control device, and
at least one of (i) modify, based on the received second learned knowledge, an operation of the first process control device to control, in real-time, the process, or (2) perform a second learning analysis on at least some of the locally stored process data and the received second learned knowledge.

12. A method of supporting distributed big data using a field device that is (i) communicatively coupled to a first communications network of a process plant, (ii) operating, based on control signals delivered via the first communications network, to control a process in real-time in the process plant, and (iii) configured to perform a physical function to control at least a pre-determined portion of the process in real-time, the method comprising, at the field device:
at least one of:
receiving, at the field device, data via the first communications network and using the received data to perform the physical function to control at least the pre-determined portion of the process in real-time, or
generating, by the field device, data as a result of performing the physical function and transmitting the generated data via the first communications network to control at least the pre-determined portion of the process in real-time;
collecting data at the field device, the data including at least one of: (i) the data that is generated by the field device as a result of performing the physical function, (ii) data that is created by the field device, or (iii) the data that is received at the field device and used by the field device to perform the physical function;
locally storing, in an embedded big data apparatus included in the field device, the collected data;

performing, by the embedded big data apparatus included in the field device, a learning analysis on at least a portion of the locally stored data;

generating, by the embedded big data apparatus, learned knowledge indicative of a result of the learning analysis, the learned knowledge including at least one of a time relationship or a causal relationship between process variables having values included in the locally stored process data, and wherein the learned knowledge is included in the data that is created by the field device;

locally storing the generated learned knowledge in the embedded big data apparatus included in the field device;

modifying, based on a first at least a portion of the locally stored learned knowledge, an operation of the field device to control the process in real-time; and distributing, via a process control big data network that is different than the first communications network, the first at least a portion of the locally stored learned knowledge or a second at least a portion of the learned knowledge to another device, the another device including a respective embedded big data apparatus.

13. The method of claim 12, wherein performing the learning analysis comprises performing at least one of a machine learning analysis, a predictive analysis, data mining, or data discovery.

14. The method of claim 12, wherein collecting the data at the field device comprises at least one of: collecting all data that is generated by the field device, collecting all data that is created by the field device, or collecting all data that is received at the field device.

15. The method of claim 12, wherein collecting the data at the field device comprises at least one of: collecting data that is generated by the field device at a rate of generation, collecting all data that is created by the field device at a rate of creation, or collecting all data that is received at the field device at a rate of reception.

16. The method of claim 12, wherein collecting the data at the field device comprises collecting, at the field device, at least one type of data included in a set of types of data that includes continuous data, event data, measurement data, batch data, calculated data, and configuration data.

17. The method of claim 12, wherein:
the field device is a first device, the learned knowledge is first learned knowledge, and the operation of the first device is a first operation; and
the method further comprises:
receiving, at the first device, second learned knowledge generated by a second device, the second learned knowledge determined by an embedded big data apparatus of the second device;
performing, by the embedded big data apparatus of the first device, a further learning analysis on the second learned knowledge and at least some of the stored data;
generating, by the embedded big data apparatus of the first device, further learned knowledge indicative of a result of the further learning analysis;
locally storing the further learned knowledge in the embedded big data apparatus included in the field device;
modifying the first operation or a second operation of the first device to control the process in real-time based on the locally stored, further learned knowledge.

18. The method of claim 17, wherein receiving the second learned knowledge generated by the second device comprises receiving the second learned knowledge generated by one of: another field device, a controller, an I/O device, a user interface device, a gateway device, an access point, a routing device, a historian device, or a network management device.

19. The method of claim 12, further comprising causing one or more portions of the locally stored learned knowledge to be distributed to yet another device, wherein a device type of the yet another device is one of field device, controller, or I/O device.

20. The method of claim 12, wherein generating the learned knowledge comprises generating at least one of: additional data that was previously unknown to the field device, a new or modified application, a new or modified function, a new or modified routine, or a new or modified service.

21. A system for supporting distributed big data in a process plant, the system comprising:
a process control big data network having a plurality of nodes, the plurality of nodes including a first node that is a field device configured to at least one of:
(i) perform a physical function to control at least a pre-determined portion of the process executing in the process plant, generate first real-time data corresponding to the performed physical function, and transmit, via a communications network within the process plant that is different than the process control big data network, the first real-time data to another process control device operating to control the at least the pre-determined portion of the process, or
(ii) receive second real-time data from the another process control device via the communications network, and perform the physical function based on the second real-time data; and
each of the plurality of nodes is configured to:
collect respective data generated in real-time resulting from control of a process executing in the process plant;
locally store the collected respective data at a respective embedded big data apparatus included in the each of the plurality of nodes; and
perform, by the respective embedded big data apparatus included in the each of the plurality of nodes, a respective learning analysis on at least a portion of the locally stored data, thereby generating respective learned knowledge;
locally store the generated respective learned knowledge at the respective embedded big data apparatus included in the each of the plurality of nodes; and
wherein the field device is further configured to cause at least a portion of the respective learned knowledge that is locally stored at the embedded big data apparatus included in the field device and that is indicative of a result of a performance of the respective learning analysis of the field device to be distributed, via the process control big data network, to a second node included in the plurality of nodes for use in the respective learning analysis of the second node or in another respective learning analysis of the second node, the at least the portion of the respective learned knowledge that is locally stored at the field device including at least one of a time relationship or a causal relationship between process variables having values included in the locally stored process data.

22. The system of claim 21, wherein the field device is a first field device, and the plurality of nodes further includes at least one of:

a controller configured to receive a set of inputs, determine, based on the set of inputs, a value of an output, and cause the output to be transmitted, via the communications network, to the first field device to control the process executed by the process plant, wherein the first field device is configured to perform the physical function based on the output of the controller to control the process;

a second field device;

an input/output (I/O) device having an interface to the controller and an interface to at least one of the first field device or the second field device;

a user interface device;

a gateway device;

an access point;

a routing device;

a historian device; or a network management device.

23. The system of claim 21, wherein:

the plurality of nodes further includes a controller that is configured to receive a set of inputs, determine, based on the set of inputs, a value of an output, and cause the output to be transmitted, via the communications network that is different than the process control big data network, to the field device to control the at least the pre-determined portion of the process executed by the process plant; and the field device is configured to perform the physical function based on the output of the controller to control the at least the pre-determined portion of the process executed by the process plant.

24. The system of claim 23, wherein the controller includes a first interface to the communications network and a second interface to the process control big data network.

25. The system of claim 21, wherein the generated respective learned knowledge includes at least one of respective application, a respective function, a respective service, or a respective routine.

26. The system of claim 21, wherein the result of the performance of the respective learning analysis includes a prediction based on properties of the at least the portion of the locally stored data.

27. The system of claim 21, wherein the result of the performance of the respective learning analysis includes additional data that was previously unknown to the first node.

28. The system of claim 21, wherein the learned knowledge locally stored at the embedded big data apparatus of the first node is first learned knowledge, and wherein the second node is configured to:

receive the first learned knowledge from the first node;

perform, by the respective embedded big data apparatus included in the second node, the respective learning analysis of the second node or another respective learning analysis of the second node on the first learned knowledge and at least a portion of locally collected and stored data at the second node; and at least one of:

store, at the respective embedded big data apparatus of the second node, second learned knowledge indicative of a result the performance of the respective learning analysis of the second node or the another respective learning analysis of the second node;

modify an operation of the second node to control the process based on the second learned knowledge; or cause the second learned knowledge to be distributed, via the process control big data network, to a third node of the plurality of nodes.

29. The system of claim 28, wherein the third node is configured to:

receive the second learned knowledge from the second node;

perform, by the respective embedded big data apparatus of the third node, the respective learning analysis of the third node or another respective learning analysis of the third node on the second learned knowledge and at least a portion of locally collected and stored data at the third node; and at least one of:

store, at the respective embedded big data apparatus of the third node, third learned knowledge indicative of a result the performance of the respective learning analysis of the third node or the another respective learning analysis of the third node;

modify an operation of the third node to control the process based on the third learned knowledge; or cause the third learned knowledge to be distributed, via the process control big data network, to a fourth node of the plurality of nodes.

* * * * *